United States Patent [19]

Ito

[11] Patent Number: 5,090,379

[45] Date of Patent: Feb. 25, 1992

[54] FUEL INJECTION DEVICE OF AN ENGINE FOR A VEHICLE

[75] Inventor: Yasusi Ito, Susono, Japan

[73] Assignee: Toyota Jidosha Kabushiki Kaisha, Toyota, Japan

[21] Appl. No.: 706,646

[22] Filed: May 29, 1991

[30] Foreign Application Priority Data

Jun. 4, 1990 [JP] Japan .................. 2-144465

[51] Int. Cl.⁵ .................. F02D 41/04; F02D 41/10
[52] U.S. Cl. .................. 123/299; 123/478; 123/492; 74/866
[58] Field of Search .......... 123/299, 300, 478, 480, 123/486, 492, 493; 364/431.05; 74/859, 860, 866

[56] References Cited

U.S. PATENT DOCUMENTS

| | | | |
|---|---|---|---|
| 4,424,785 | 1/1984 | Ishida et al. | 123/478 X |
| 4,546,732 | 10/1985 | Mae et al. | 123/478 X |
| 4,612,904 | 9/1986 | Tadokoro et al. | 123/492 |
| 4,621,599 | 11/1986 | Igashira et al. | 123/300 |
| 4,697,478 | 10/1987 | Mastumoto et al. | 74/860 X |
| 4,713,763 | 12/1987 | Hofmann | 74/860 X |
| 4,768,486 | 9/1988 | Koike et al. | 123/478 X |
| 4,819,604 | 4/1989 | Koike et al. | 123/492 |
| 4,825,834 | 5/1989 | Toshimitsu et al. | 123/492 X |
| 4,883,039 | 11/1989 | Toshimitsu et al. | 123/492 X |
| 5,003,944 | 4/1991 | Moote et al. | 123/299 |

FOREIGN PATENT DOCUMENTS

| | | | |
|---|---|---|---|
| 58-79630 | 5/1983 | Japan. | |
| 59-115438 | 7/1984 | Japan. | |
| 59-119030 | 7/1984 | Japan. | |
| 60-19943 | 2/1985 | Japan. | |
| 60-32961 | 2/1985 | Japan. | |
| 0017343 | 1/1987 | Japan | 123/300 |

Primary Examiner—Willis R. Wolfe
Attorney, Agent, or Firm—Kenyon & Kenyon

[57] ABSTRACT

A fuel injection device of an engine for a vehicle having a power transmitting system connected between the engine and the drive wheel. The relative angle of torsion between the opposed ends of the power transmitting system is maintained at the converging angle of torsion determined by a required amount of fuel when a cruising operation of the engine is carried out. When the required amount of fuel is changed from a first required amount of fuel to a second required amount of fuel, a pre-injection is carried out prior to the main injection. The amount of fuel and the injection time of the pre-injection and the start time of the main injection are determined so that the relative angle of torsion becomes equal to the converging angle of torsion determined by the second required amount of fuel when the main injection is started, and that the relative angle of torsion is maintained at the converging angle of torsion determined by the second required amount of fuel after the main injection is started.

16 Claims, 20 Drawing Sheets

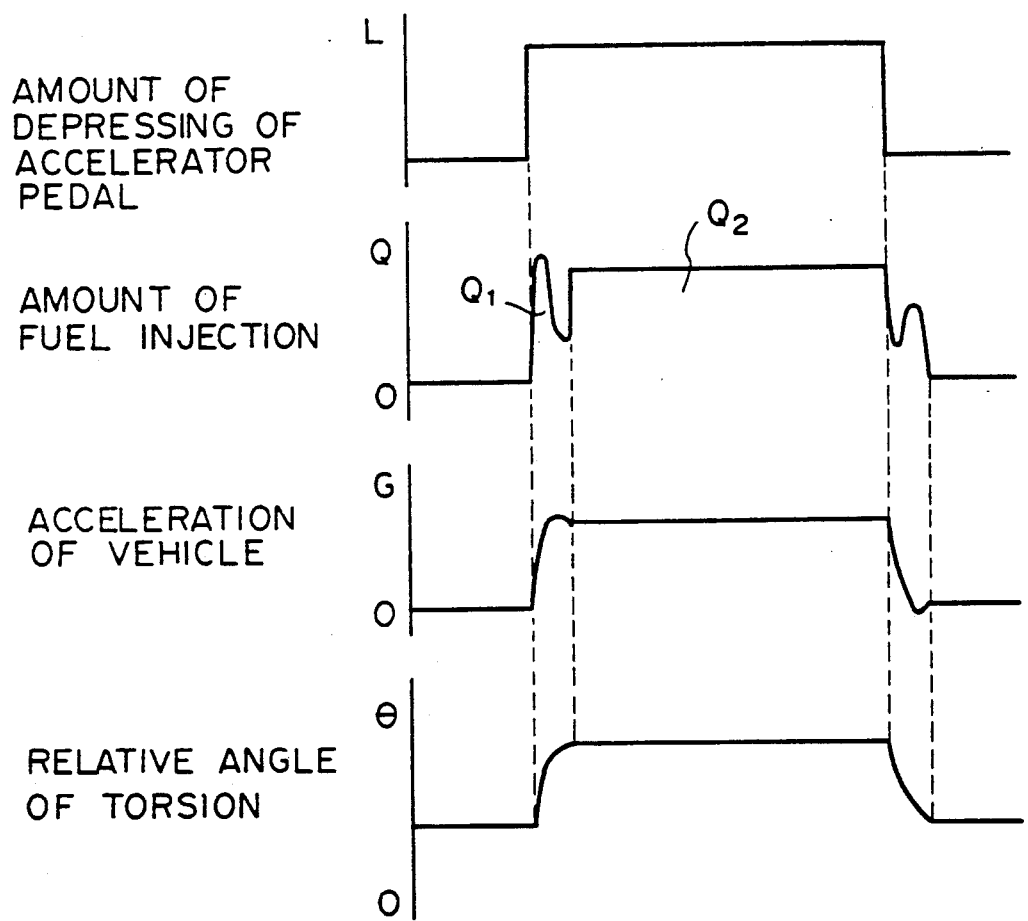

FUEL INJECTION DEVICE OF AN ENGINE FOR A VEHICLE

BACKGROUND OF THE INVENTION

1. Field of the Invention

The present invention relates to a fuel injection device of an engine for a vehicle.

2. Description of the Related Art

In an internal combustion engine constructed so that a required amount of fuel injection is determined by an amount of a depression of an accelerator pedal and an engine speed, and an amount of fuel corresponding to the required amount of fuel is injected, a problem arises in that a vehicle surges forward and backward when an output of the engine is quickly raised or reduced by an acceleration or deceleration operation. The reasons for this surging of the vehicle forward and backward are given as follows.

FIG. 22 shows a typical drive system of a vehicle, wherein A represents an engine B is an engine output shaft and C is a power transmitting system connected between the engine output shaft B and drive wheel D. The power transmitting system C includes a clutch, a transmission, and a propeller shaft or the like. Note, these elements are collectively and generally shown as one rod. In the thus-represented vehicle, a torsion is generated in the power transmitting system C during a drive of the vehicle, and the relative torsional angle generated between the opposed ends of the power transmitting system C at this time is hereinafter called a relative angle of torsion. This relative angle of torsion is represented by $\theta$ in FIG. 22. When the required fuel injection amount is constant and does not change, and the vehicle is in a cruising state, the relative angle of torsion $\theta$ is maintained at a fixed angle of torsion corresponding to the required fuel injection amount i.e., the output of the engine. The fixed angle of torsion corresponding to the required fuel injection amount is hereinafter called a converging angle of torsion, and this converging angle of torsion is represented by $\theta a$ and $\theta b$ in FIG. 23. Namely, when the required fuel injection amount is maintained at a constant value Qa in FIG. 23 and does not change, while the vehicle is in a cruising state, the relative angle of torsion $\theta$ is maintained at a constant converging angle of torsion $\theta a$. Also, when the required fuel injection amount is maintained at a constant value Qb and does not change, while the vehicle is in the cruising state, the relative angle of torsion $\theta$ is maintained at a constant converging angle of torsion $\theta b$. Accordingly, when the vehicle is in a cruising state, the relative angle of torsion $\theta$ is maintained at the constant converging angle of torsion corresponding to the required fuel injection amount.

When the vehicle is in a transient state wherein the required fuel injection amount is abruptly changed, however, the relative angle of torsion $\theta$ is not maintained at the converging angle of torsion corresponding to the required fuel injection amount. Namely, as shown in FIG. 23, when a driver quickly depresses the accelerator pedal and the required fuel injection amount is abruptly changed from Qa to Qb, the output of the engine is quickly raised, although the speed of the vehicle cannot be increased immediately after the raising of the output of the engine because the vehicle has a large mass. Accordingly, the relative angle of torsion $\theta$ at this time becomes larger than the converging angle of torsion $\theta b$ corresponding to the required fuel injection amount Qb, and a part of the increase in the output of the engine is stored in the power transmitting system C as elastic energy. Then, as shown in FIG. 23, the speed of the vehicle increases and the vehicle acceleration G increases. Since, at that time, torque due to the elastic energy stored in the power transmitting system C in addition to the output torque of the engine is imposed on the drive wheel D, the vehicle acceleration G becomes higher than an acceleration Gb determined by the output of the engine. When the vehicle acceleration G is higher than the acceleration Gb determined by the output of the engine, however, the relative angle of torsion $\theta$ of the power transmitting system C becomes inappropriate, the vehicle acceleration G is poor, i.e., the relative angle of torsion $\theta$ becomes smaller than the converging angle of torsion Qb corresponding to the required fuel injection amount Qb, and thus the vehicle acceleration G becomes lower than the acceleration Gb determined by the output of the engine. Therefore, when the required fuel injection amount Q is rapidly increased, the relative angle of torsion $\theta$ of the power transmitting system C is rapidly varied, and accordingly, the vehicle acceleration G is adversely affected, and thus the vehicle surges forward and backward. Since a vibration damping system is provided in the power transmitting system C, the amplitude of the relative angle of torsion $\theta$ in the power transmitting system C and the amplitude of the vehicle acceleration G is gradually lessened whereby the surging of the vehicle is gradually reduced, and when the speed of the vehicle increases after the acceleration is started, the vehicle acceleration Gb is gradually reduced. Nevertheless, as long as the required fuel injection amount Q is constant, even if the speed of the vehicle increases, the vehicle driving force is maintained at a constant value, so that as long as the required fuel injection amount Q is Qb, the relative angle of torsion $\theta$ is maintained at $\theta b$. As understood from FIG. 23, such a forward and backward surging of the vehicle is also generated when the required fuel injection amount Q is lowered from Qb to Qa.

In a well-known internal combustion engine, the required fuel injection amount Q is gradually increased at a predetermined low speed, to thus reduce the forward and backward surging of the vehicle as shown by broken lines in FIG. 23, when a driver quickly depresses the accelerator pedal, and the required fuel injection amount Q is slowly reduced at low speed, as shown by the broken lines, when the amount of depression of the accelerator pedal is quickly changed (refer to Japanese Unexamined Patent Publication No. 60-19943).

When the required fuel injection amount Q is changed at a low speed under a transient operating state, however, the rise in the vehicle acceleration G is slow, as shown by broken lines in FIG. 23, and the response to an acceleration operation is poor. When the required fuel injection amount Q is slowly changed at a low speed, in such a transient operating state, the amplitude of the vehicle acceleration G becomes low, but the forward and backward surging of the vehicle is generated as usual.

SUMMARY OF THE INVENTION

An object of the present invention is to provide a fuel injection device having a superior response to an acceleration without the generating of the forward and backward surging of vehicle.

According to the present invention, there is provided a fuel injection device of an engine for a vehicle having a power transmitting system connected between the engine and a drive wheel, a relative angle of torsion between opposed ends of the power transmitting system being maintained at a converging angle of torsion determined by an amount of fuel required when the engine is driven in a cruising state, the device comprising a calculating means for calculating a required amount of fuel, which is increased in accordance with an increase in an engine load, fuel injection means for carrying out a pre-injection and then a main injection when the required amount of fuel is changed from a first required amount of fuel to a second required amount of fuel, the amount of the main injection being equal to the second required amount of fuel, and injection control means for controlling an amount of fuel and an injection time of the preinjection and a start time of an injection of the main injection to substantially equalize the relative angle of torsion to the converging angle of torsion determined by the second required amount of fuel when the main injection is started, and to substantially maintain the relative angle of torsion at the converging angle of torsion determined by the second required amount of fuel after the main injection is started.

The present invention may be more fully understood from the description of preferred embodiments of the invention set forth below, together with the accompanying drawings.

BRIEF DESCRIPTION OF THE DRAWINGS

In the drawings:

FIGS. 6A–6D are views showing various injection patterns;

DESCRIPTION OF THE PREFERRED EMBODIMENTS

Figure 5:
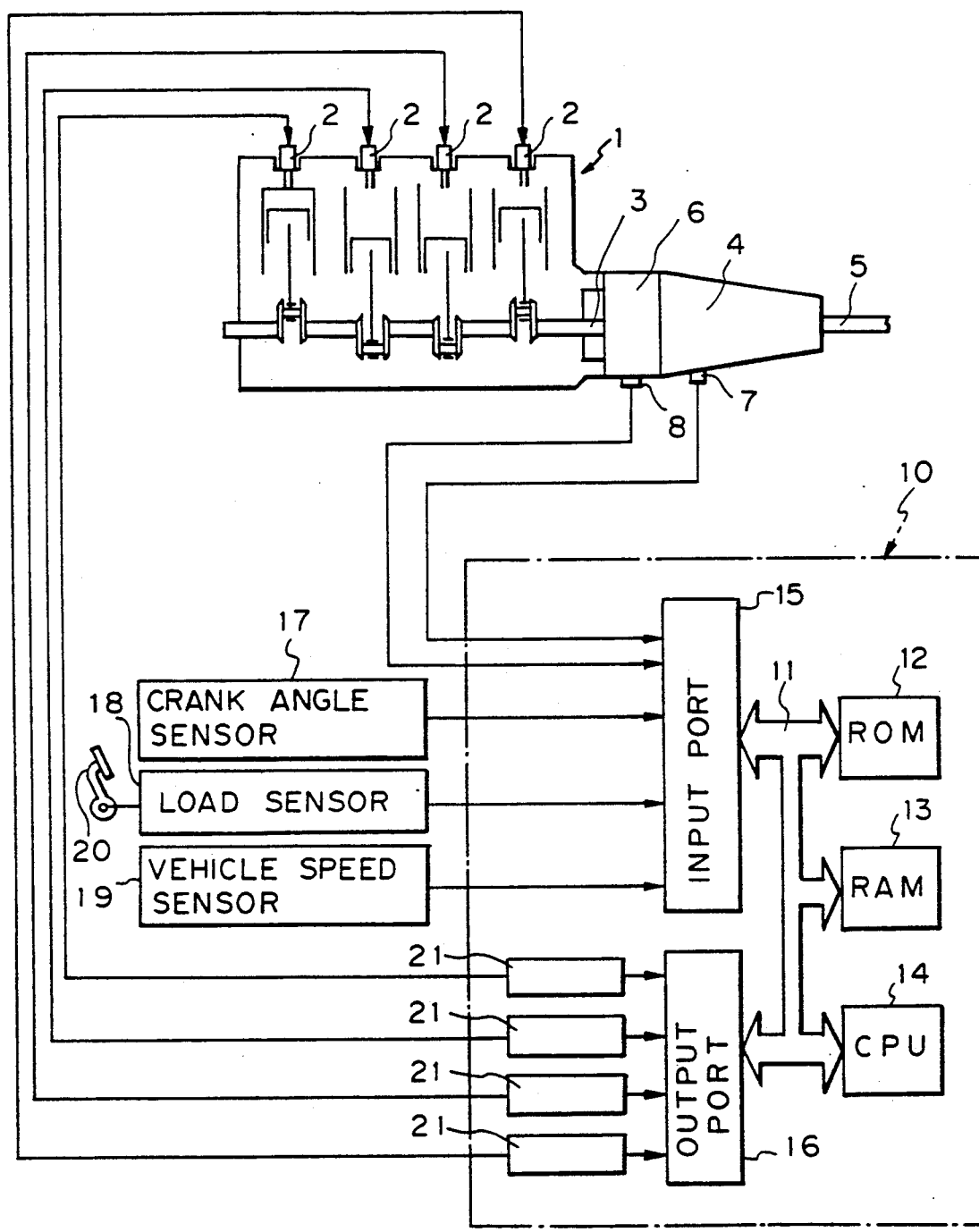
FIG. 5 is a general view of an internal combustion engine.

Referring to FIG. 5, an engine main body 1, fuel injection valves 2, an engine output shaft 3 and a transmission 4 are respectively shown. The output shaft 5 of the transmission 4 is connected to a drive wheel. Where the transmission 4 is an automatic type, a torque converter 6 is arranged between the engine output shaft 3 and the transmission 4, and where the transmission is a manual type, a clutch device 6 is arranged between the engine output shaft 3 and the transmission 4. A gear position detector 7 for detecting the position of a gear is mounted on the transmission 4, as required. A clutch operation detector 8 is attached to the clutch device 6 if necessary. The injection of fuel from the fuel injection valves 2 is controlled based on the output signal of an electronic control unit 10.

The electronic control unit 10 comprises a digital computer consisting of a ROM (read only memory) 12, a RAM (random access memory) 13, a CPU (microprocessor) 14, an input port 15 and an output port 16, which are interconnected by a bidirectional bus 11. To the input port 15 are connected a crank angle sensor 17, a load sensor 18 and a vehicle speed sensor 19, as well as the gear position detector 7 and the clutch operation detector 8. The crank angle sensor 17 generates an output pulse every time a crank shaft rotates by a constant crank angle, for example, 30°, and this output pulse is input to the input port 15. Therefore, an engine speed can be calculated from this output pulse. An amount of depression of an accelerator pedal 20 is A/D converted by the load sensor 18 and input to the input port 15. The vehicle speed sensor 19 generates an output pulse every time, for example, the output shaft 5 rotates by a constant angle, and this output pulse is input to the input port 15. The output port 16 is connected to the fuel injection valve 2 through a corresponding drive circuit 21.

Referring to FIG. 6, a method of controlling a fuel injection when an engine is driven in a transient state will be described.

Figure 6A:
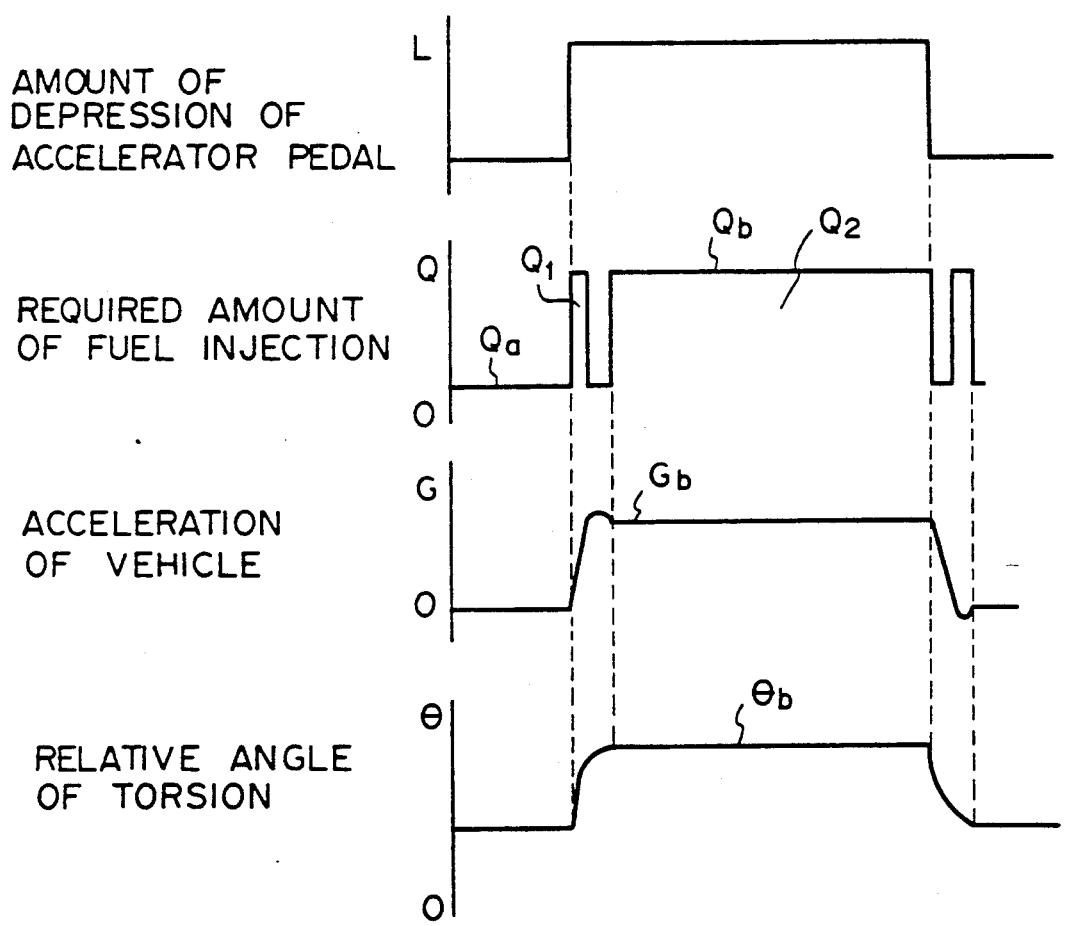
Figure 6B:
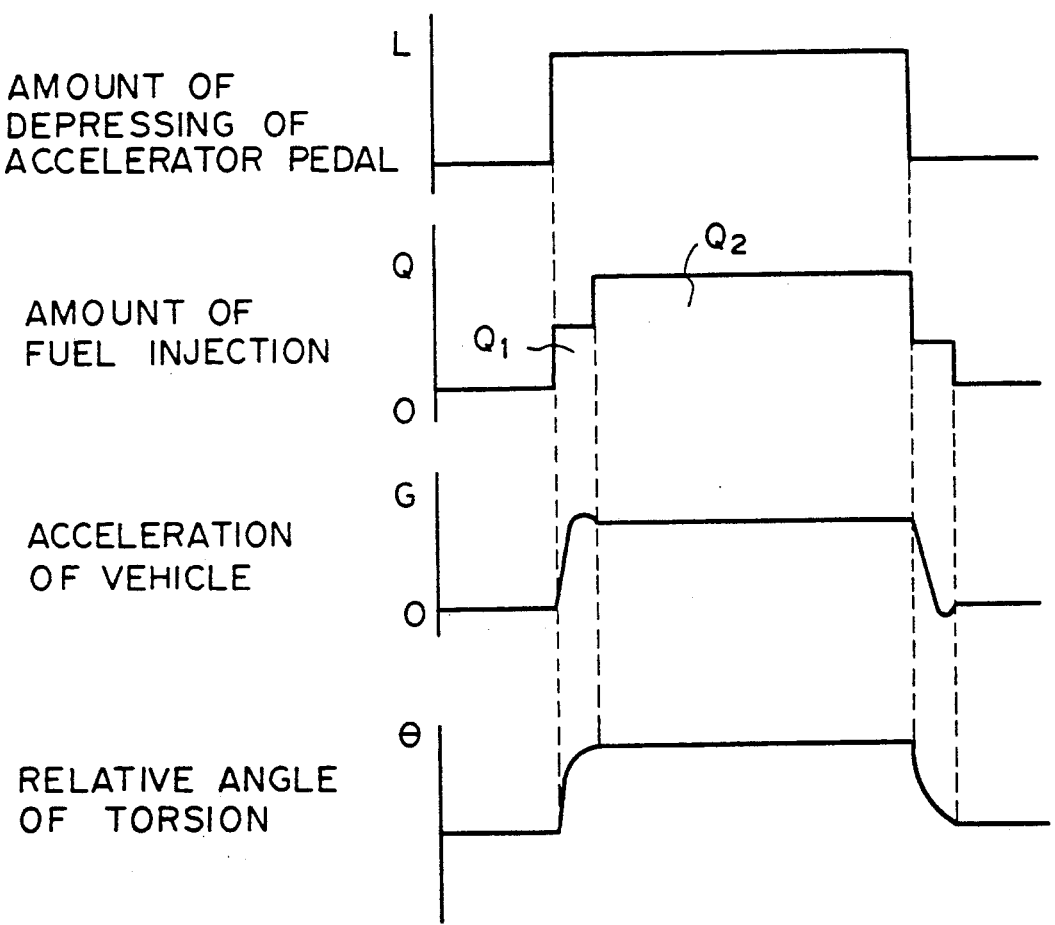
Figure 6D:
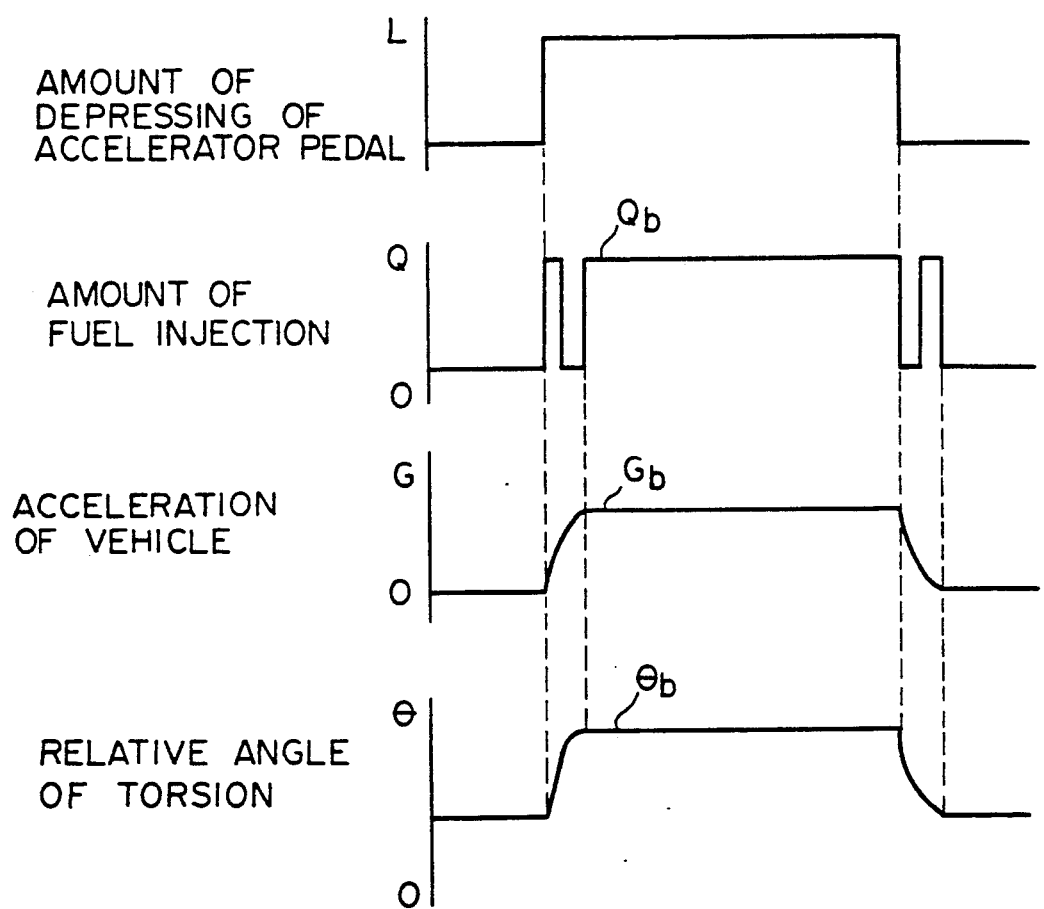

With reference to an embodiment shown in FIG. 6(A), when a driver quickly depresses an accelerator pedal and a required fuel injection amount Q is changed from Qa to Qb, a pre-injection $Q_1$ is first carried out for several cycles, and then a main injection $Q_2$ having an amount corresponding to the required fuel injection amount Qb is carried out. When the pre-injection $Q_1$ is carried out, the engine output is rapidly increased, and accordingly, a relative angle of torsion $\theta$ of a power transmitting system is increased. When the relative angle of torsion $\theta$ is increased, the vehicle acceleration G is increased. Thereafter, when the relative angle of torsion $\theta$ reaches a converging angle of torsion $\theta$b determined by the required fuel injection amount Qb and the vehicle acceleration G is equal to the vehicle acceleration Gb at a start time of the main injection $Q_2$, the main injection $Q_2$ is started. Since the vehicle acceleration G after acceleration is started is maintained at Gb, when the main injection $Q_2$ is started at such a time, the vehicle does not surge forward and backward. Namely, when an engine is driven in an accelerating state, the amount of the pre-injection $Q_1$ is determined so as to bring the relative angle of torsion $\theta$ to $\theta b$. Then, when the relative angle of torsion $\theta$ becomes $\theta b$ and the vehicle acceleration G becomes Gb, the main injection $Q_2$ is started, and thus the forward and backward surging of the vehicle is not generated. FIG. 6(D) shows an example of a power transmitting system having no vibration damping system. In this case, when the vehicle acceleration G reaches a peak, it becomes the vehicle acceleration Gb immediately after acceleration at the start time of a main injection having an amount of fuel corresponding to the required fuel injection amount $Q_2$ Actually, however, the power transmitting system has the vibration damping system. In this instance, energy taken by the vibration damping system as well as energy required for equalizing the relative angle of torsion of the power transmitting system to $\theta b$ must be applied to an output of an engine, and a part of the energy taken by the vibration damping system permits the acceleration G to be given to a vehicle. Thus, when the power transmitting system has the vibration damping system, the vehicle acceleration G temporarily becomes higher than Gb until the relative angle of torsion $\theta$ reaches $\theta b$, as shown in FIG. 6(A).

FIG. 6(A) shows an example where the amount of fuel injection performed during each cycle of the pre-injection $Q_1$ is equal to the required fuel injection amount Qb during each cycle of the main injection $Q_2$ and a cycle in which an amount of fuel injection is Qa is interposed between the pre-injection $Q_1$ and the main injection $Q_2$. As shown in FIG. 6(B), however, the amount of fuel injection during each cycle of the pre-injection $Q_1$ may be lower than the amount of fuel injection during each cycle of the main injection $Q_2$, and the main injection $Q_2$ may be carried out successively to the pre-injection $Q_1$. Further, as shown in FIG. 6(C), the amount of fuel injection during each cycle of the pre-injection $Q_1$ may be changed in the form of a curve.

The amount of fuel injection is temporarily reduced when an engine is driven in a decelerating state, as in the case of an acceleration, and then, after a while, the required amount of fuel injection is obtained. In this instance, the amount of fuel injection may be reduced in accordance with various methods as shown in FIGS. 6(A) to (C).

Now, referring to FIGS. 1 and 2, analytical results of the injection period and the amount of fuel injection of the pre-injection and the start time of injection of the main injection will be described in the following.

Figure 1:
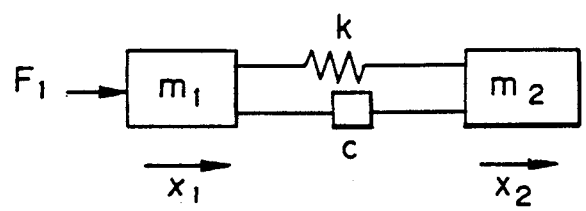
FIG. 1 is a view showing an object to be controlled, as a model.

In an analysis thereof, an object to be controlled is initially designated as a model as shown in FIG. 1.

As shown in FIG. 1, it is assumed that an engine having a mass $m_1$ and a vehicle having a mass $m_2$ are connected by a power transmitting system having a spring constant k and a damping coefficient c. It is assumed the displacement of the engine is $x_1$ and the displacement of the vehicle is $x_2$ when the engine generates a driving force $F_1$. If the radius of a drive wheel is represented by r and the displacement of an engine output shaft is represented by $x_1$(rad), a relationship $x_1 \cdot r = x_2$ is obtained. Therefore, the mass $m_1$ of the engine represents an equivalent mass with the above relationship taken into account. This equivalent mass $m_1$ changes in accordance with the change gear ratio of a transmission. The driving force $F_1$ of the engine corresponds to a required fuel injection amount.

Figure 2:
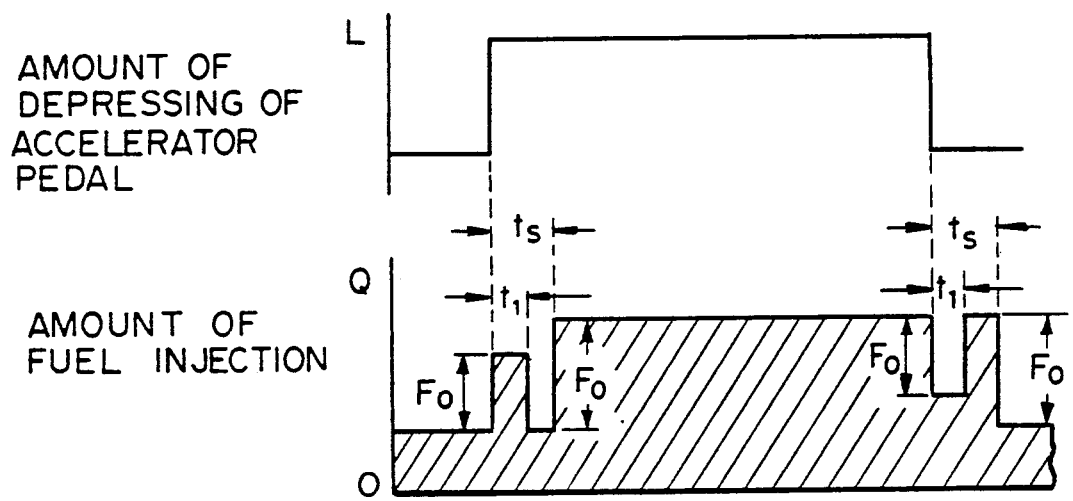
FIG. 2 is a view showing an injection pattern.

As injection pattern is shown in FIG. 2. Namely, it is assumed that, during a period of pre-injection $t_1$ after a driver quickly depresses an accelerator pedal, a driving force Foi is generated in an engine, i.e., a required fuel injection amount Foi is generated for several cycles. It is further assumed that a required driving force Fo is generated after a time of ts, since the driver depressed the accelerator pedal after an elapse of the pre-injection period i.e., a required amount of fuel Fo is injected. The following analysis will be carried out under the above-mentioned conditions.

The following differential equations are first obtained for the model shown in FIG. 1.

$$m_1 \ddot{x}_1 = F_1(t) - k(x_1 - x_2) - c(\dot{x}_1 - \dot{x}_2) \quad (1)$$

$$m_2 \ddot{x}_2 = k(x_1 - x_2) + c(\dot{x}_1 - \dot{x}_2) \quad (2)$$

If $F(s) = L[F_1(t)]$, $x_1(o) = x_2(o) = 0$, $\dot{x}_1(o) = \dot{x}_2(o) = 0$, the Laplace transformation of the above equations (1) and (2) are performed, and the following results are obtained.

$$m_1 S^2 x_1 = F(s) - kx_1 + kx_2 - CSx_1 + CSx_2 \quad (3)$$

$$m_1 S^2 x_2 = kx_1 - kx_2 + CSx_1 - CSx_2 \quad (4)$$

$x_1$ and $x_2$ of the equations (3) and (4) are solved as follows.

$$x_1 = \frac{(m_2 S^2 + CS + k)F(s)}{(m_1 S^2 + CS + k)(m_2 S^2 + CS + k) - (CS + K)^2} \quad (5)$$

$$x_2 = \frac{(CS + k)F(s)}{(m_1 S^2 + CS + k)(m_2 S^2 + CS + k) - (CS + K)^2} \quad (6)$$

If a unit impulse is applied as an input, the equation (6) can be represented as follows, since $F(S) = 1$.

$$x_2 = \frac{1}{m_1 + m_2} \cdot \frac{1}{S^2} - \frac{1}{S^2 + 2\zeta\omega_o S + \omega_o^2} \quad (7)$$

wherein:

$$\omega_o^2 = \frac{m_1 + m_2}{m_1 m_2} k \quad \zeta = \frac{C}{2} \sqrt{\frac{m_1 + m_2}{m_1 m_2 k}}$$

If the equation (7) is inverted, an expression described below is obtained.

$$x_2 = \frac{1}{m_1 + m_2} t - \frac{1}{\sqrt{\omega_o 1 - \zeta^2}} e^{-\zeta\omega_o t} \sqrt{\sin 1 - \zeta^2} \, \omega_o t \quad (8)$$

$\dot{x}_2$ and $\ddot{x}_2$ of the equation (8) are respectively obtained as follows:

$$x_2 = \frac{1}{m_1 + m_2} \left( 1 - \frac{\zeta}{\sqrt{1 - \zeta^2}} e^{-\zeta\omega_o t} \sin \sqrt{1 - \zeta^2} \, \omega_o t - \right. \quad (9)$$

$$\left. e^{-\zeta\omega_o t} \sqrt{\cos 1 - \zeta^2} \, \omega_o t \right)$$

-continued $$x_2 = \frac{1}{m_1 + m_2} \left( 2\zeta\omega_o e^{-\zeta\omega_o t} \cos\sqrt{1-\zeta^2}\,\omega_o t + \frac{1-2\zeta^2}{\sqrt{1-\zeta^2}} \omega_o e^{-\zeta\omega_o t} \sin\sqrt{1-\zeta^2}\,\omega_o t \right) \quad (10)$$

Then, an acceleration of vehicle $x_2$ when a rectangular wave $F_{oi} \cdot t_1$ is applied to obtain by the following equation, according to the superposition of the acceleration when the unit impulse is applied, which is represented by the equation (10).

$$x_2(t) = \int_0^{t_1} F_o x_2(t-\tau)d\tau \quad (11)$$

The above equation can be solved as follows:

$$x_2(t) = \frac{F_o e^{-\zeta\omega_o t}}{m_1 + m_2} \left[ e^{-\zeta\omega_o t} \left\{ \cos\sqrt{1-\zeta^2}\,\omega_o(t-t_1) + \frac{\zeta}{\sqrt{1-\zeta^2}} \sin\sqrt{1-\zeta^2}\,\omega_o(t-t_1) \right\} - \left\{ \cos\sqrt{1-\zeta^2}\,\omega_o t + \frac{\zeta}{\sqrt{1-\zeta^2}} \sin\sqrt{1-\zeta^2}\,\omega_o t \right\} \right] \quad (12)$$

Next, the transient displacement of an extension of a spring of a power transmitting system having a spring constant of k will be obtained.

When the equation (1) is divided by $m_1$ and the equation (2) is divided by $m_2$ and the subtractions of respective sides of the equations (1) and (2) are performed, the following result is obtained.

$$x_1 - x_2 = \frac{F_1}{m_1} - k\left[\frac{1}{m_1} + \frac{1}{m_2}\right](x_1-x_2) - c\left[\frac{1}{m_1} + \frac{1}{m_2}\right](x_1-x_2) \quad (13)$$

Assuming that $x_{12} = x_1 - x_2$, the Laplace transformation of the equation (13) is performed. Then, assuming that the unit impulse is applied, when the result is inverted, the equation (13) is changed as described below.

$$x_{12} = \frac{1}{m_1\omega_o\sqrt{1-\zeta^2}} e^{-\zeta\omega_o t} \sin\sqrt{1-\zeta^2}\,\omega_o t \quad (14)$$

Then, the transient displacement $x_{12}$ of the spring when the rectangular wave $F_{oi} \cdot t_1$ is applied is obtained by a superposition of the displacement $x_{12}$ when the unit impulse is applied, which is represented by the equation (14), from the following equation.

$$x_{12}(t) = \int_0^{t_1} F_{oi} \frac{1}{m_1\omega_o\sqrt{1-\zeta^2}} e^{-\zeta\omega_o(t-\tau)} \sin\sqrt{1-\zeta^2}\,\omega_o(t-\tau)d\tau \quad (15)$$

The equation (15) is solved as follows.

$$x_{12}(t) = \frac{F_o e^{-\zeta\omega_o t}}{m_1\omega_o^2} \left[ e^{\zeta\omega_o t}\left\{ \cos\sqrt{1-\zeta^2}\,\omega_o(t-t_1) - \frac{\zeta}{\sqrt{1-\zeta^2}} \sin\sqrt{1-\zeta^2}\,\omega_o(t-t_1) \right\} - \left\{ \cos\sqrt{1-\zeta^2}\,\omega_o t - \frac{\zeta}{\sqrt{1-\zeta^2}} \sin\sqrt{1-\zeta^2}\,\omega_o t \right\} \right] \quad (16)$$

Next, conditions will be considered under which a vehicle does not surge when a drive force Fo is applied to an engine after a time ts has passed since the driver quickly depressed the accelerator pedal, as shown in FIG. 2.

The condition under which the vehicle does not surge forward and backward when the drive force Fo is applied to the engine means that the acceleration of vehicle does not change when the drive force Fo is applied to the engine. In other words, after or before the drive force Fo is applied to the engine, two conditions wherein the transient displacement of the spring $x_{12}$ does not change and the vehicle acceleration does not change, are simultaneously satisfied. Assuming that the vehicle acceleration when the drive force Fo is applied to the engine is as shown above, these two conditions can be represented by the equations described below.

$$kx_{12}(t_s) = m_2 a_s = \frac{m_2}{m_1 + m_2} F_o \quad (17)$$

$$x_2(t_s) = a_s = \frac{F_o}{m_1 + m_2} \quad (18)$$

The equation (17) indicates that spring force $kx_{12}$ (ts) where t=ts is equal to a force exerted on the spring when the drive force Fo is applied to the engine. Namely, after or before the drive force Fo is applied to the engine, the spring force $kx_{12}$ does not change, i.e., the transient displacement of the spring $x_{12}$ does not change.

The equation (18) indicates that the vehicle acceleration $x_2$ (ts) when t=ts is equal to the vehicle acceleration when the drive force Fo is applied to the engine, i.e., the vehicle acceleration $x_2$ immediately before the drive force Fo is applied to the engine is equal to the vehicle acceleration when the drive force Fo is applied to the engine.

When the equation (18) is satisfied but the equation (17) is not satisfied, a positive or negative acceleration is exerted on the vehicle due to the spring force $kx_{12}$ when the drive force Fo is generated, and therefore, the vehicle surges forward and backward. On the other hand, when the equation (17) is satisfied but the equation (18) is not satisfied, the vehicle surges forward and backward because the positive or negative acceleration due to the drive force Fo is exerted on the vehicle when the drive force Fo is generated. In order to prevent the generation of the forward and backward surging of the vehicle when the drive force Fo is generated, it is necessary to simultaneously satisfy the equations (17) and (18).

The transient displacement of spring $x_{12}$ corresponds to the relative angle of torsion of the power transmitting system. The equation (17), therefore, means that the relative angle of torsion $\theta$ does not change before and after the generation of the drive force Fo. In other words, immediately before the generation of the drive force Fo, the relative angle of torsion $\theta$ becomes a converging angle of torsion determined by the drive force Fo. When the equation (18) is not satisfied and the vehicle vibrates forward and backward, the relative angle of torsion $\theta$ vibrates about the converging angle of torsion determined by the drive force Fo. When the equation (18) is satisfied, even after the drive force Fo is generated, the relative angle of torsion $\theta$ is maintained at the converging angle of torsion. Accordingly, the simultaneous satisfaction of the equations (17) and (18) implies that the relative angle of torsion $\theta$ becomes the converging angle of torsion immediately before the generation of the drive force Fo, and the relative angle of torsion is maintained at the converging angle of torsion after the generation of the drive force Fo.

As mentioned above, if an amount of fuel and an injection time of a pre-injection and a start time of an injection of a main injection are predetermined so that the relative angle of torsion $\theta$ becomes the converging angle of torsion immediately before the generation of the drive force Fo, and the relative angle of torsion is maintained at the converging angle of torsion after the generation of the drive force Fo, i.e., the equations (17) and (18) are simultaneously satisfied, the vehicle does not surge forward and backward.

Then, the amount of fuel and the injection time of the pre-injection and the start time of injection of the main injection will be obtained so as to satisfy the equations (17) and (18).

Initially, when $x_{12}$ is erased from the equations (16) and (17) and assuming that $$e^{\zeta\omega_o t_1} = e^P, \sqrt{1-\zeta^2}\,\omega_o t_s = x, \sqrt{1-\zeta^2}\,\omega_o t_1 = y$$

an equation described below will be obtained.

$$e^{-\zeta\omega_o t_s}\left[e^P\cos(x-y) - \cos x - \right.$$

$$\left. \frac{\zeta}{\sqrt{1-\zeta^2}}\{e^P\sin(x-y) - \sin x\}\right] = \frac{F_o}{F_{oi}} \quad (19)$$

Next, when $x_2$ is erased from the equations (12) and (18), the following result will be obtained.

$$e^{-\zeta\omega_o t_s}\left[e^P\cos(x-y) - \cos x + \right. \quad (20)$$

$$\left. \frac{\zeta}{\sqrt{1-\zeta^2}}\{e^P\sin(x-y) - \sin x\}\right] = \frac{F_o}{F_{oi}}$$

Then, when the equation (19)−the equation (20), and the equation (19)+the equation (20) are calculated, the following results are obtained.

$$e^P\sin(x-y) - \sin x = 0 \quad (21)$$

$$e^{-\zeta\omega_o t_s}\{e^P\cos(x-y) - \cos x\} = \frac{F_o}{F_{oi}} \quad (22)$$

From these equations (21) and (22), the following two equations will be obtained.

$$t_s = \frac{1}{\sqrt{1-\zeta^2}\,\omega_o}\left\{\pi + \tan^{-1}\frac{e^{\zeta\omega_o t_1}\sin\sqrt{1-\zeta^2}\,\omega_o t_1}{e^{\zeta\omega_o t_1}\cos\sqrt{1-\zeta^2}\,\omega_o t_1 - 1}\right\} \quad (23)$$

$$F_{oi} = \frac{e^{\zeta\omega_o t_s}}{\sqrt{e^{2\zeta\omega_o t_1} - 2e^{\zeta\omega_o t_1}\cos\sqrt{1-\zeta^2}\,\omega_o t_1 + 1}}\,F_o \quad (24)$$

ts of the equation (23) is a function of $t_1$ and Foi of the equation (24) is a function of $t_1$ and ts. Thus, when $t_1$ is first set to a proper value, ts will be obtained from the equation (23) and Foi will be obtained from the equation (24). When it is assumed that the amount of fuel of the pre-injection is Foi, the injection time of fuel of the pre-injection is $t_1$, and the start time of the main injection is ts, the vehicle does not surge forward and backward when an engine is driven in an accelerating state. As shown in FIG. 2, after an amount of depression of an accelerator pedal is abruptly reduced, the amount of fuel is reduced by Foi during a time of $t_1$, and reaches a required fuel injection amount after a time of ts, since the amount of depression of the accelerator pedal was reduced, so that the vehicle can be prevented from surging forward and backward when the engine is driven in a decelerating state.

Figure 3:
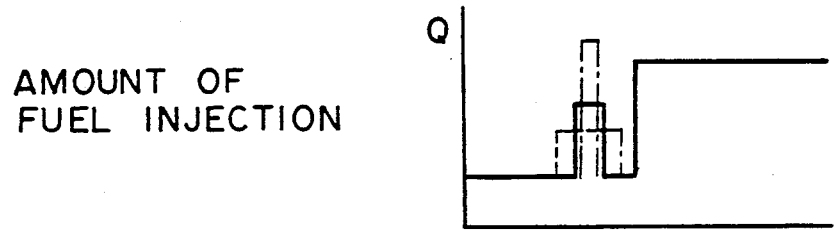
FIG. 3 is a view showing various pre-injection patterns.

As illustrated in FIG. 3, the amount of fuel of the pre-injection Foi is variously changed in accordance with the setting of $t_1$. In this instance, any pre-injection pattern may be adopted.

Where the power transmitting system has no vibration damping system, the relationship between $t_1$, ts, Fo and Foi is extremely simple, as designated by the following expressions.

$$t_1 = \frac{2}{\omega_o}\sin^{-1}\frac{F_o}{2F_{oi}} \quad (25)$$

$$t_s = \frac{1}{\omega_o}\left[\sin\frac{F_o}{2F_{oi}} + \frac{\pi}{2}\right] \quad (26)$$

Figure 4A:
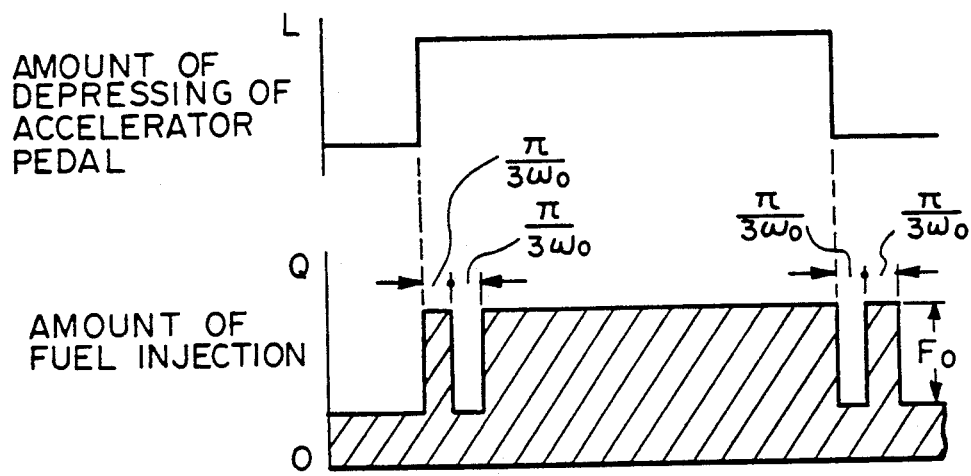
FIGS. 4A and 4B are views showing injection patterns when a power transmitting system has no vibration transmitting system.
Figure 4B:
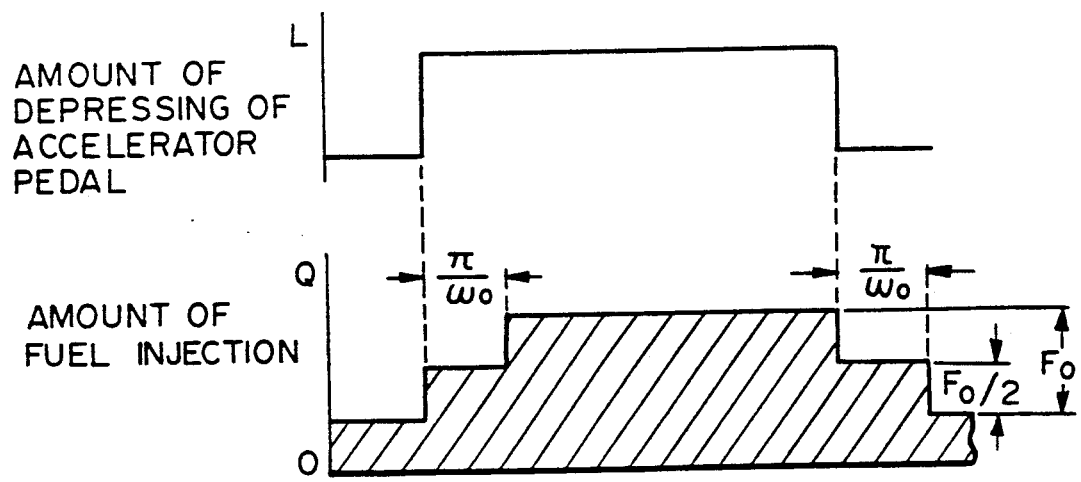

In this case, assuming that Fo=Foi, the fuel injection pattern is that shown in FIG. 4(A), and assuming that Foi=Fo/2, the pattern is as shown in FIG. 4(B).

Next, examples of the present invention when actually applied to a fuel injection device will be described with reference to FIGS. 7 to 21.

Figure 7A:
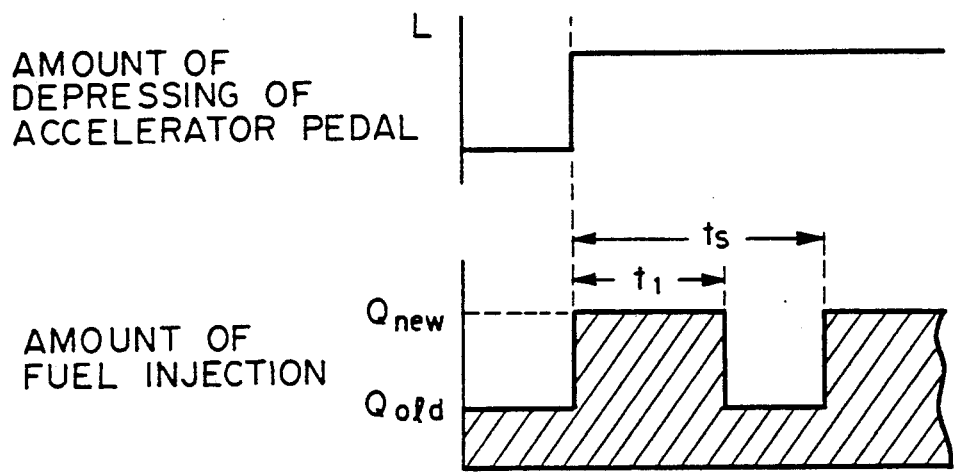
FIGS. 7A and 7B are views showing various injection patterns when an engine is accelerated.

FIG. 7(A) shows an embodiment where an amount of fuel of a pre-injection is equal to that of a main injection.

Figure 7B:
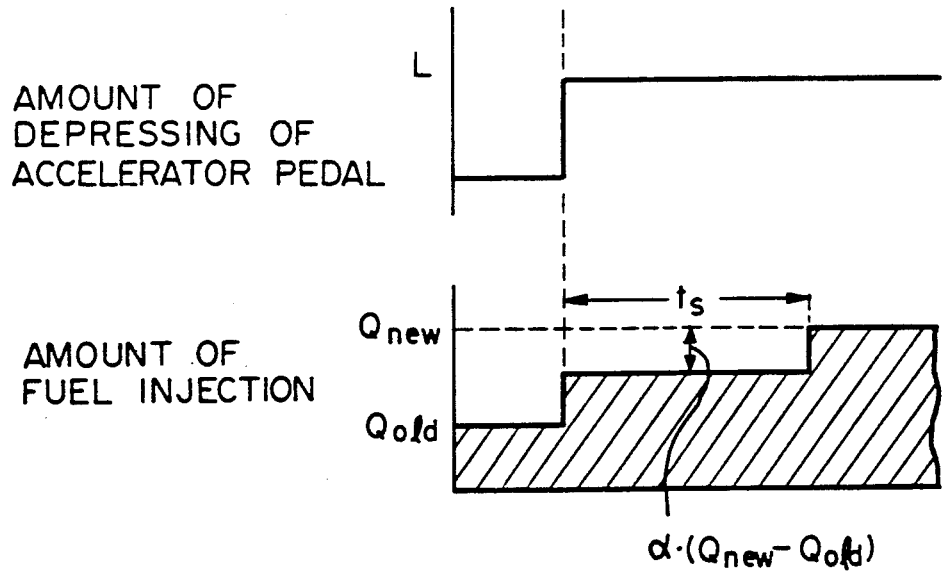

In this case, $t_1$ and ts are readily determined from the equations (23) and (24). FIG. 7(B) shows an example where an injection time of fuel of a pre-injection $t_1$ is equal to ts. In this instance, ts and Foi/Fo are readily determined. As shown in FIG. 7(B), $\alpha(=1-\text{Foi/Fo})$ is used and $\alpha$ is readily determined.

Since the equivalent mass m of an engine is proportional to the square of a transmission gear ratio, the relationship between $t_1$, ts and Foi/Fo calculated from the equations (23) and (24) depends on the transmission gear ratio. Consequently, where the pre-injection pattern shown in FIG. 7(A) is used, values of $t_1$ and ts according to the transmission gear ratio are previously obtained and are employed. Where the pre-injection pattern shown in FIG. 7(B) is used, values of ts and $\alpha$ according to the transmission gear ratio are previously obtained and employed.

FIGS. 8 to 15 show a first embodiment when the pre-injection pattern shown in FIG. 7(A) is used.

Figure 8:
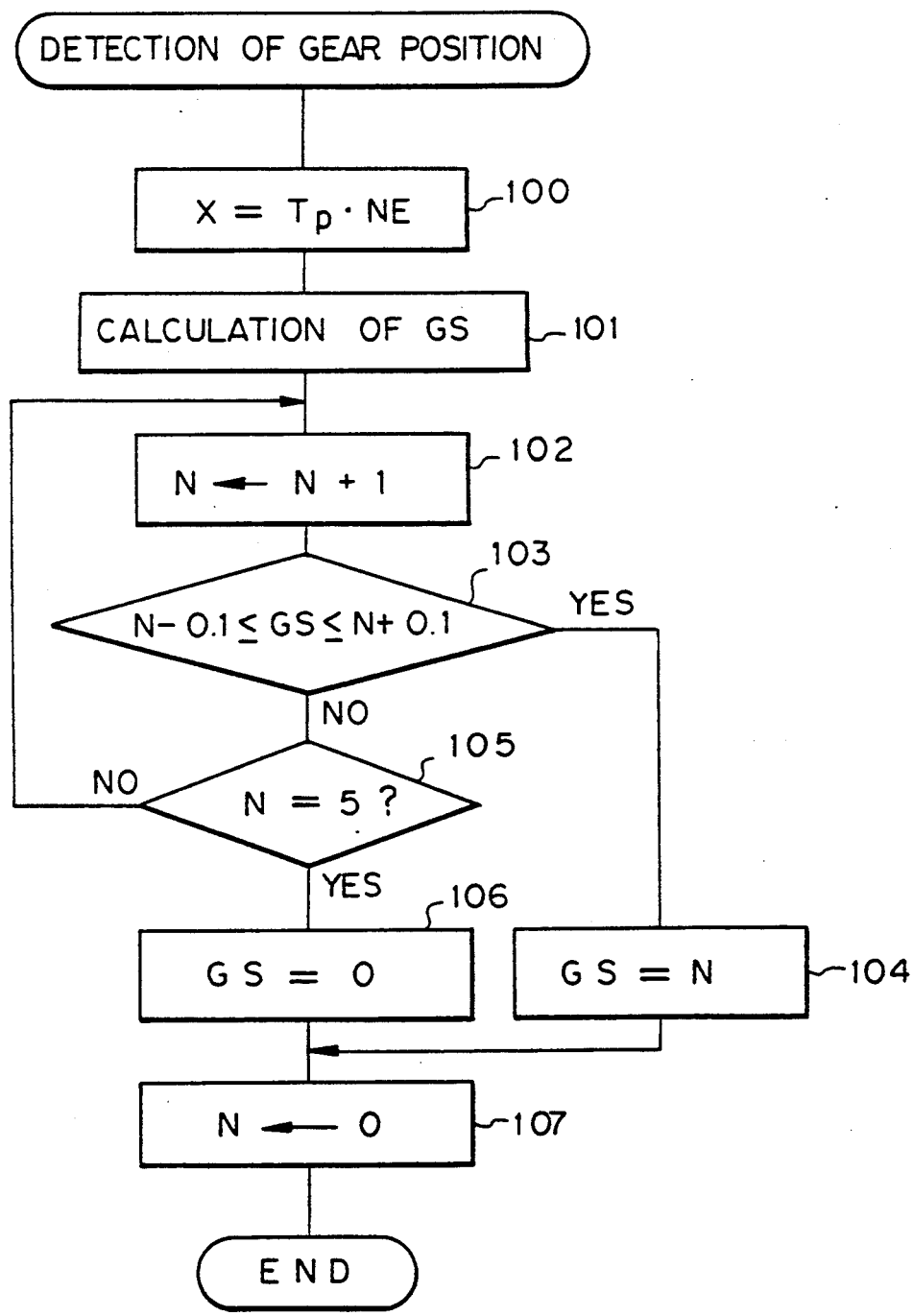
FIG. 8 is a flow chart for detecting the position of a gear.

FIG. 8 shows a routine whereby the transmission gear ratio is obtained from the output pulse of a vehicle speed sensor 19 without directly detecting a gear ratio. This method is convenient because it is not necessary to provide a detector for detecting the gear ratio. This routine is executed by, for example, an interruption at regular intervals.

Figure 13:
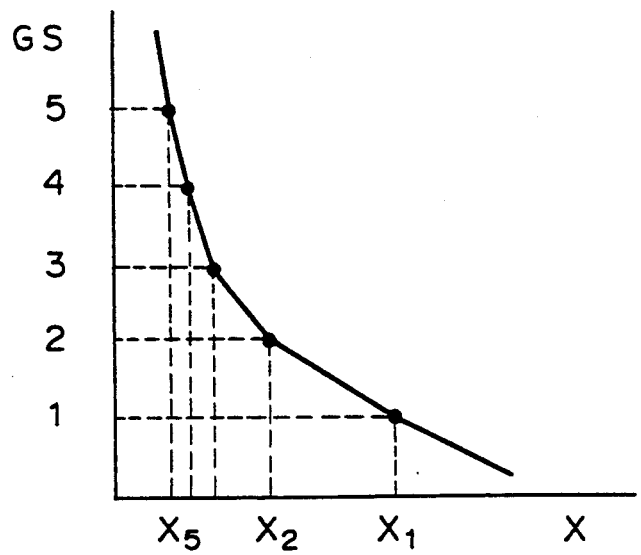
FIG. 13 is a diagram showing a relationship between a speed number GS and a reduction gear ratio X.

With reference to FIG. 8, in step 100, the output pulse space Tp of the vehicle speed sensor 19 is first multiplied by an engine speed NE to obtain a reduction gear ratio x. Then, in step 101, a speed number GS is obtained from a relationship shown in FIG. 13. In FIG. 13, respective speeds (first speed, second speed, . . . fifth speed) are represented by corresponding integers GS and the relationships of these integers GS and the corresponding reduction gear ratios $x_1, x_2, \ldots x_5$ are shown. For instance, if the reduction gear ratio is $x_2$, GS=2. This indicates that the speed number is the second speed. The relationships shown in FIG. 13 are previously stored in a ROM 12. In step 101, GS is calculated based on the reduction gear ratio x from the relationships stored in the ROM 12.

Then, in step 102, an increment of 1 of N is performed and the procedure proceeds to step 103. In step 103, whether or not GS is present between N−0.1 and N+0.1 is discriminated. If N−0.1≦GS≦n +0.1, the procedure proceeds to step 104 and GS is discriminated as GS=N. Next, the procedure proceeds to step 107, and it is discriminated whether N=0. In step 103, a discrimination of GS<N−0.1 or N+0.1<GS arises, the procedure proceeds to a step 105, and whether or not N=5 is discriminated. If N is not 5, the procedure returns to step 102. If N=5, namely, when the number of the speed corresponding to the reduction gear ratio x is not present, it proceeds to step 106 to obtain a discrimination of GS+0, and the procedure proceeds to the step 107 and it is discriminated that N=0.

Figure 9:
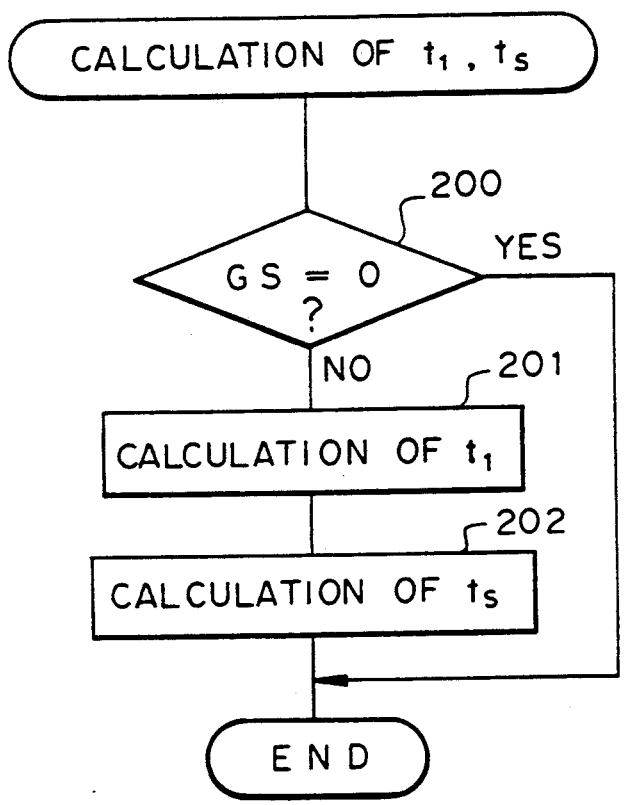
FIG. 9 is a flow chart for calculating $t_1$, $t_s$.

FIG. 9 shows a routine for calculating $t_1$ and ts based on the speed number of GS obtained from FIG. 8. This routine is executed by, for example, an interruption at regular intervals.

Figure 15:
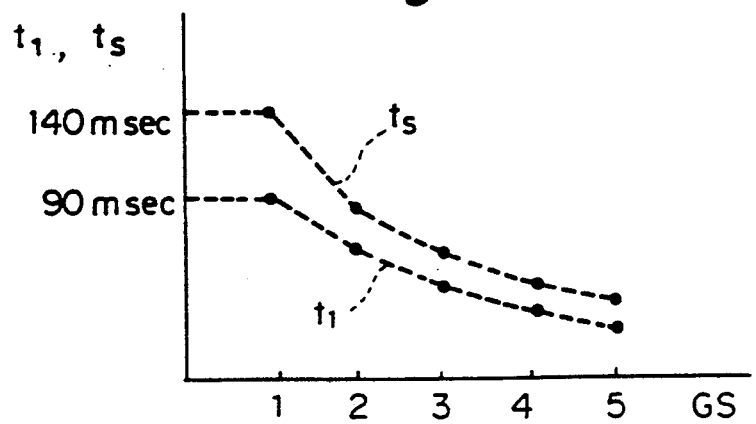
FIG. 15 is a diagram showing relationships between $t_1$, $t_s$ and GS.

With reference to FIG. 9, in step 200, whether or not GS=0 is first discriminated. When GS is not 0, the procedure proceeds to step 201, $t_1$ is calculated from a relationship shown in FIG. 15, and then it proceeds to step 202 and ts is calculated from a relationship shown in FIG. 15. The relationships between $t_1$, ts and GS shown in FIG. 15 are previously stored in the ROM 12.

Figure 10:
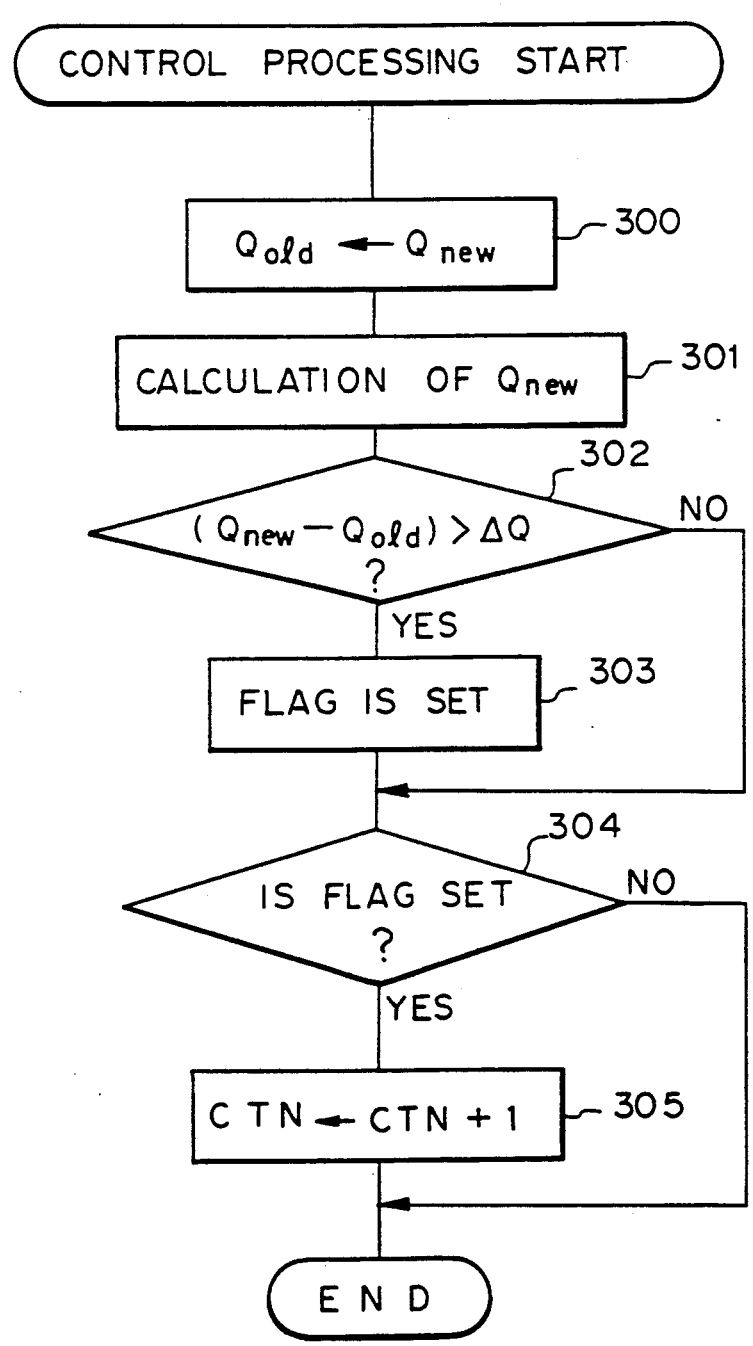
FIG. 10 is a flow chart for starting a processing for an injection control.

FIG. 10 shows a control start processing routine for performing a pre-injection and this routine is performed every 2 msec.

Figure 12:
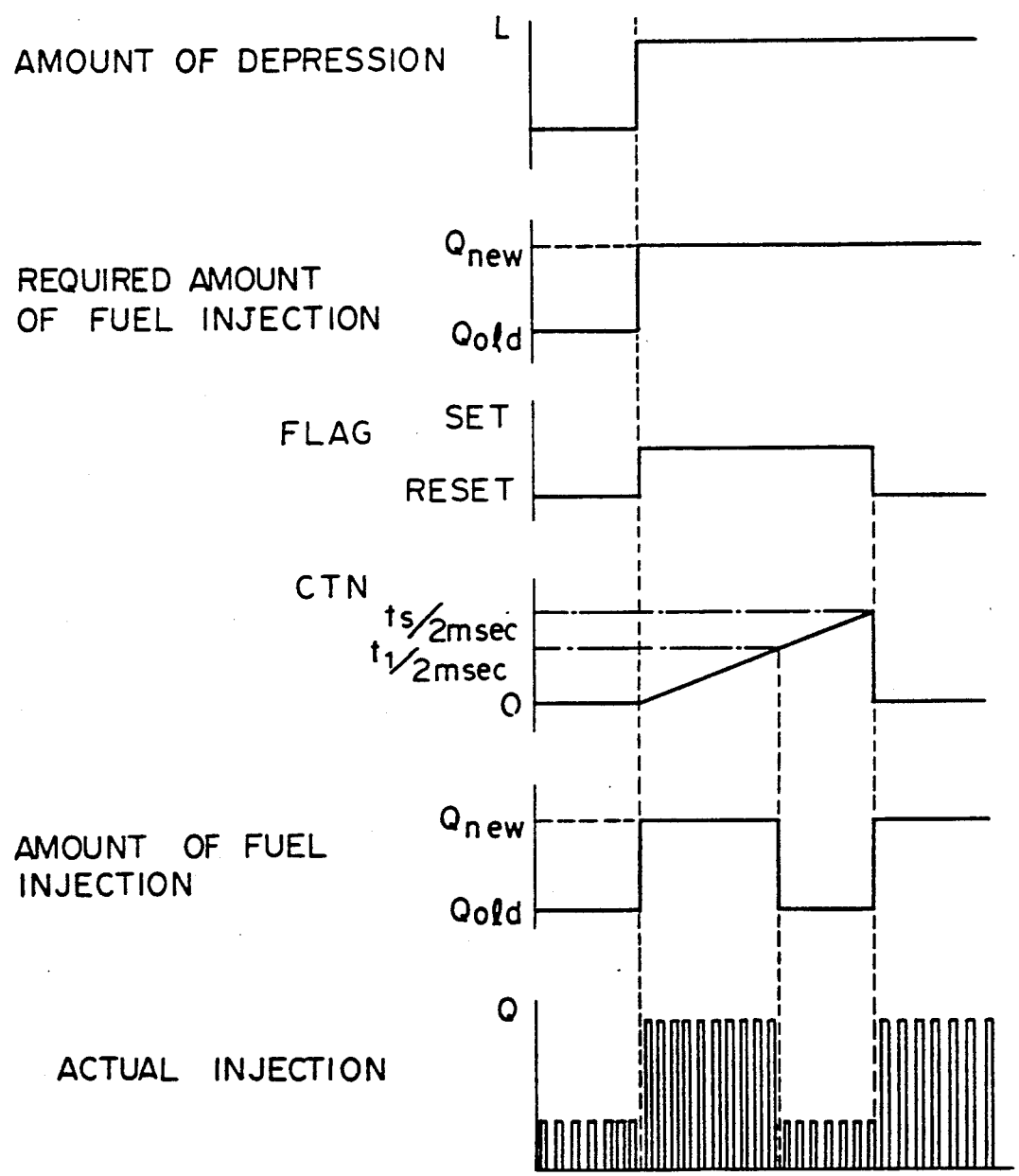
FIG. 12 is a time chart.
Figure 14:
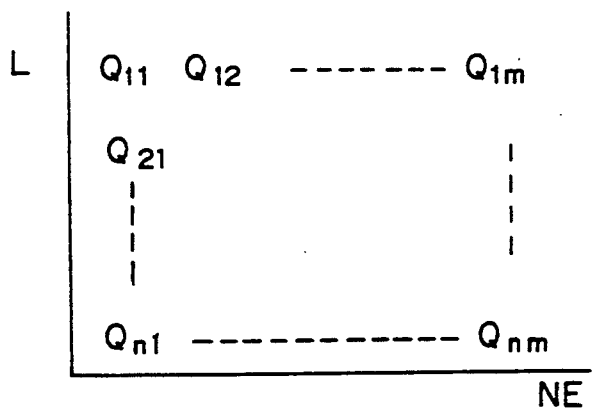
FIG. 14 is a diagram showing a required amount of fuel injection.

With reference to FIG. 10, in step 300, a required fuel injection amount Qnew of a preceding time, which is presently stored, is made Qold. Then, in step 301, the required fuel injection amount Qnew is calculated from the output signal of a load sensor 18 which represents an amount of a depression of an accelerator pedal 20 and an engine speed. The required fuel injection amount Qnew is previously stored in the ROM 12 as the function of the amount L of a depression of the accelerator pedal 20 and the engine speed NE, as shown in FIG. 14. Then, in step 302, whether or not the difference in the required fuel injection amount (Qnew−Qold) within 2 msec is not less than a constant value VQ is discriminated. When (Qnew−Qold)>ΔQ, the procedure goes to step 303, a flag is set, and then the procedure proceeds to step 304. In step 304, whether or not the flag is set is discriminated. When the flag is set, the procedure proceeds to step 305 and the increment of 1 of a count value CTN is performed. As shown in FIG. 12, when a driver quickly depresses the accelerator pedal and the required fuel injection amount changes by ΔQ or more from Qold to Qnew, the flag is thus set and the count-up operation of the count value CTN is started.

Figure 11:
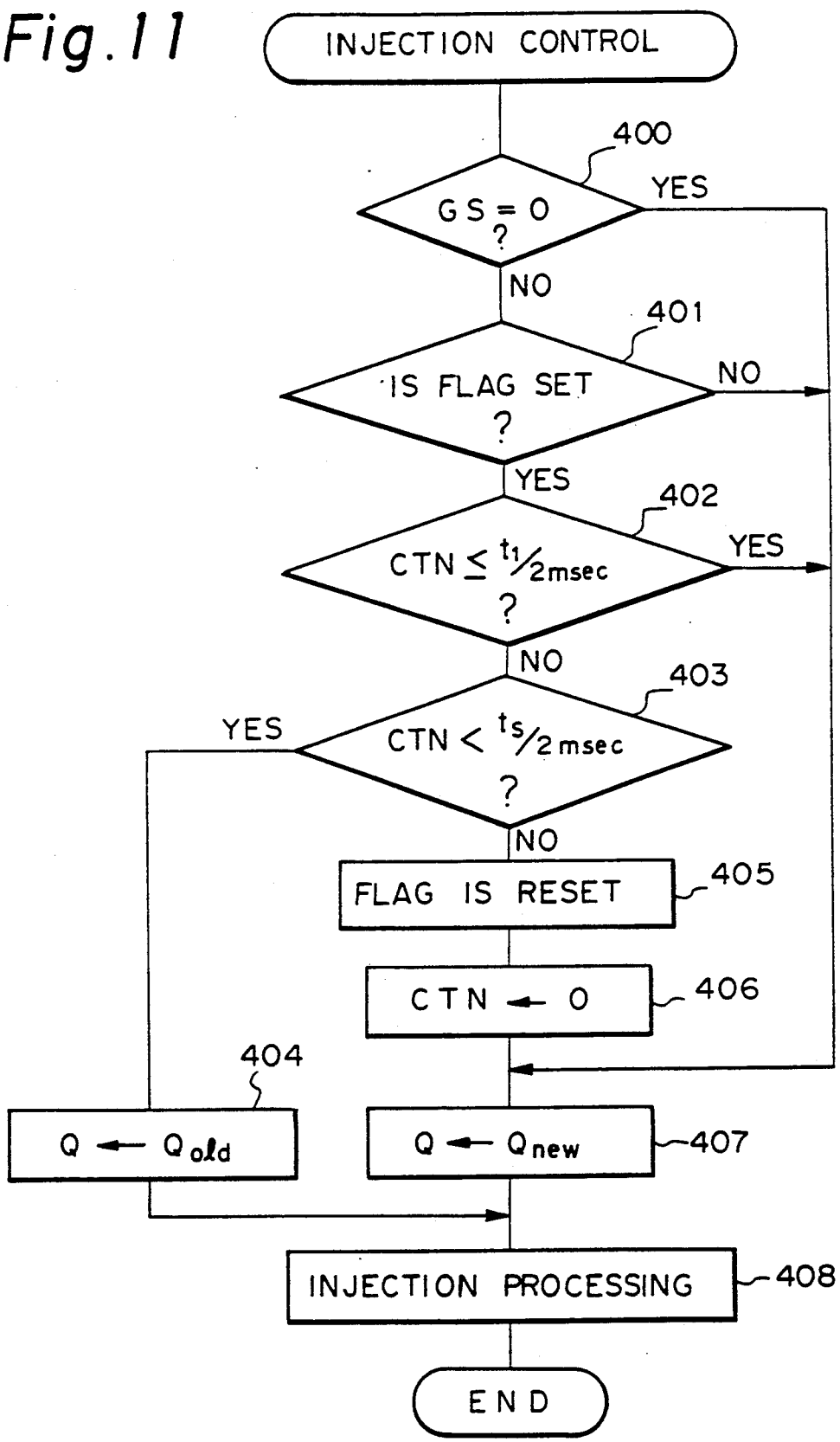
FIG. 11 is a flow chart for the injection control.

FIG. 11 shows a routine for controlling a fuel injection. This routine is executed at every constant crank angle.

With reference to FIG. 11, in step 400, whether or not GS=0 is discriminated. When GS=0, the procedure proceeds to step 407 and the required fuel injection amount Qnew is made an fuel injection amount Q. Then, in step 408, a fuel injecting operation is carried out from a fuel injection valve 2. On the other hand, when GS is not 0, the procedure proceeds to a step 401 and whether or not a flag is set is discriminated. When the flag is reset, the procedure jumps to step 407. In comparison, when the flag is set, i.e., when an engine is driven in an accelerated state, the procedure proceeds to step 402 to discriminate whether or not a count value CTC is smaller than $t_1/2$, i.e., whether or not a time of $t_1$ has elapsed. When the time of $t_1$ has not elapsed, the procedure proceeds to step 407 and the required fuel injection amount Qnew after a driver depresses the accelerator pedal 20 is regarded as the fuel injection amount Q. As shown in FIG. 12, therefore, an actual fuel injection amount Q in each cycle during the time of $t_1$ after the start of an acceleration is regarded as the required fuel injection amount Qnew.

After the time of $t_1$ has elapsed, the procedure proceeds from step 402 to step 403, to discriminate whether or not the count value CTN is smaller than ts/2, i.e., whether or not the time of ts has elapsed after the acceleration is started. When the time of ts has not elapsed, the procedure proceeds to step 404, the required fuel injection amount Qold before the acceleration is started is regarded as the fuel injection amount Q and the procedure proceeds to step 408. Consequently, as shown in FIG. 12, the actual fuel injection amount Q in each cycle until the time of ts has elapsed after the time of $t_1$ has elapsed is regarded as the required fuel injection amount Qold.

After the time of ts has elapsed, the procedure proceeds to step 405 from step 403, the flag is reset, and the procedure proceeds to step 406 and the count value CTN is made 0. Then, in step 407, the required fuel injection amount Qnew after the acceleration is started is injected. Thus, as shown in FIG. 12, when the time of ts has elapsed after the acceleration is started, the actual fuel injection amount Q in each cycle is made the required fuel injection amount Qnew.

When GS=0, since the procedure jumps to step 407 from step 400, the fuel of the required fuel injection amount Qnew is continuously injected when an engine is driven in an accelerated state. GS=0 is obtained, for example, when a transmission 4 is located at a neutral position, when a clutch is disconnected or when the clutch is half disconnected. When a pre-injection is carried out under these conditions, an excellent vehicle operability cannot be achieved, and therefore, the fuel of the required fuel injection amount Qnew is continuously injected, if the driver depresses the accelerator pedal 20 under these conditions.

FIGS. 16 to 21 show a second embodiment employing the pre-injection pattern shown in FIG. 7(B).

Figure 16:
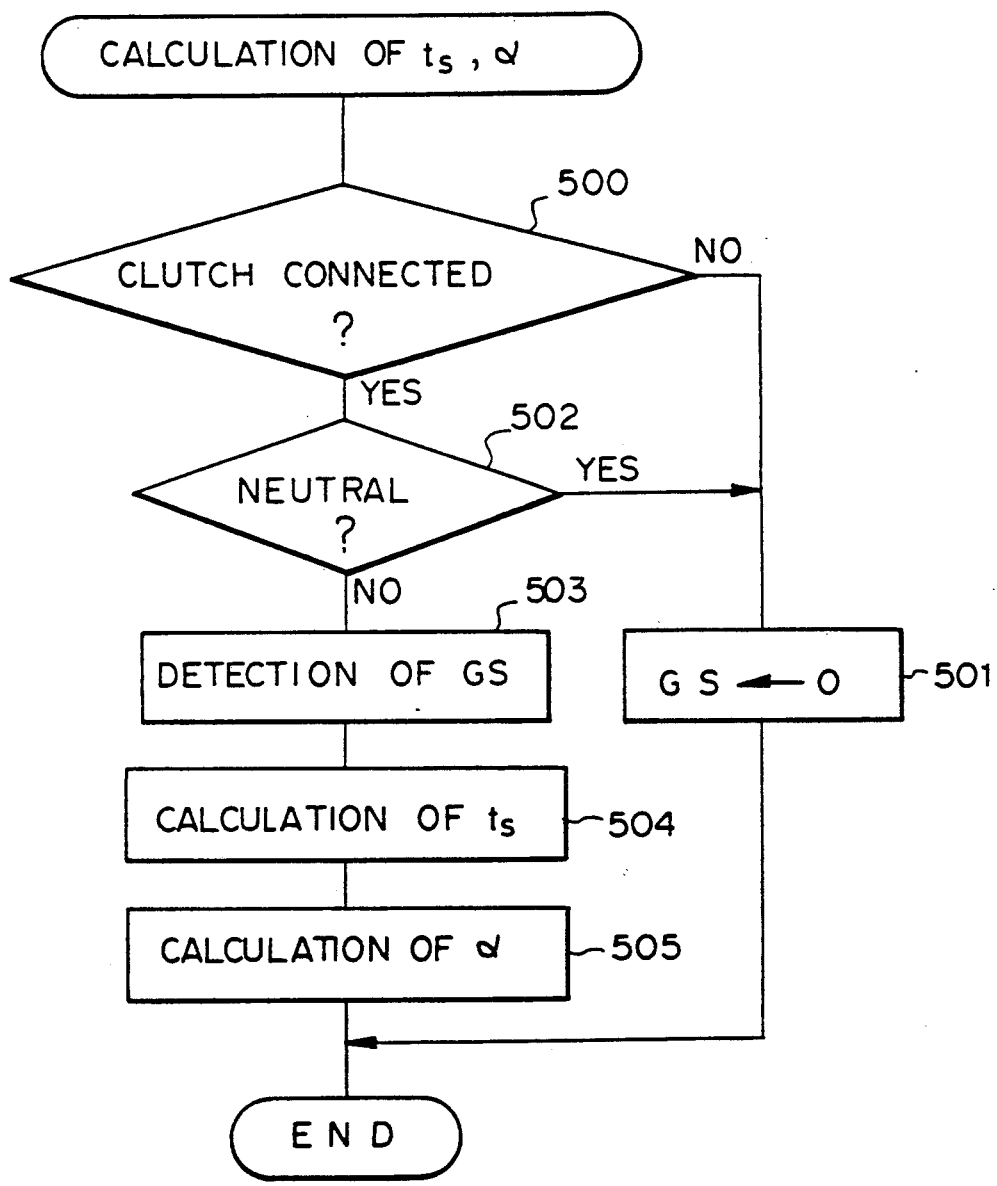
FIG. 16 is a flow chart for calculating $t_s$ and $\alpha$.

FIG. 16 shows a routine for calculating ts and $\alpha$ by directly obtaining a transmission gear position. This routine is executed by, for example, an interruption at regular intervals.

Figure 21:
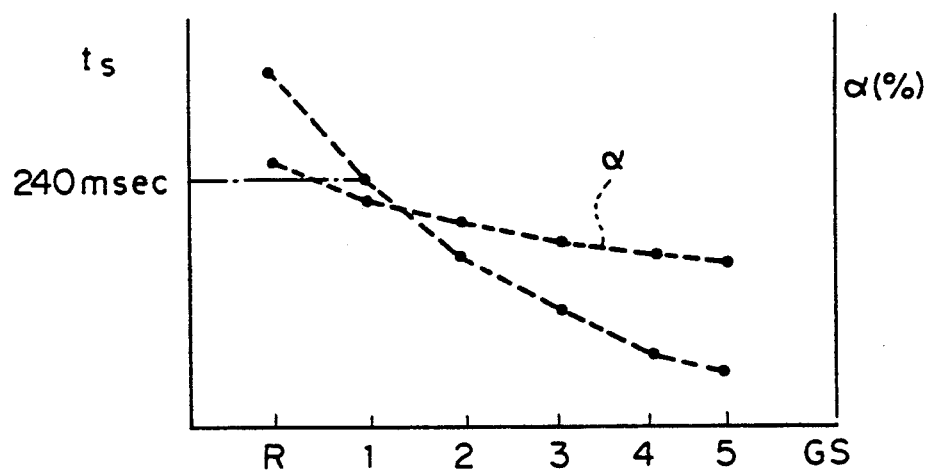
FIG. 21 is a diagram showing relationships between $t_s$, $\alpha$ and GS.
Figure 22:
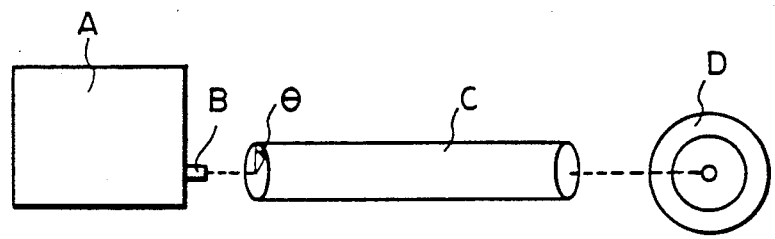
FIG. 22 is a view showing a typical driving system of a vehicle.
Figure 23:
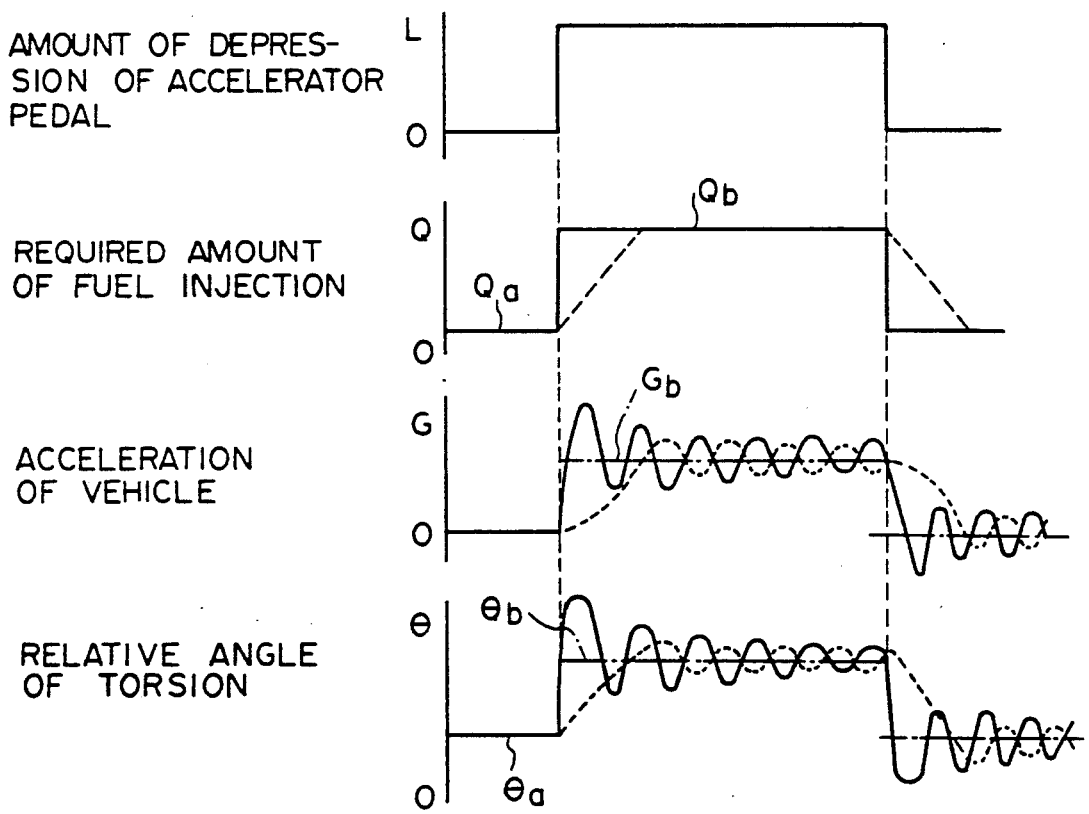
FIG. 23 is a time chart for explaining the forward and backward surging of a vehicle which is generated when the engine is accelerated.

With reference to FIG. 16, in step 500, whether or not a clutch is completely connected based on the output signal of a clutch operation detector 8 is discriminated. When the clutch is not completely connected, the procedure proceeds to step 501 and GS is made 0. On the contrary, when the clutch is completely connected, the procedure proceeds to step 502 to discriminate whether or not the transmission 4 is located at a neutral position, based on the output signal of a gear position detector 7. When the transmission 4 is located at the neutral position, the procedure proceeds to step 501 to put GS to 0. When the transmission 4 is not located at the neutral position, the procedure proceeds to step 503 to detect the speed number GS based on the output signal of the gear position detector 7. Then, the procedure proceeds to step 504, and ts is calculated from a relationship shown in FIG. 21. Thereafter, the procedure proceeds to step 505, and $\alpha$ is calculated from the relationship shown in FIG. 21. Numeric values of the axis of abscissa in FIG. 21 designate the speed number GS and R indicates a retracted position. The relationships among ts, $\alpha$ and GS shown in FIG. 21 are previously stored in the ROM 12.

Figure 17:
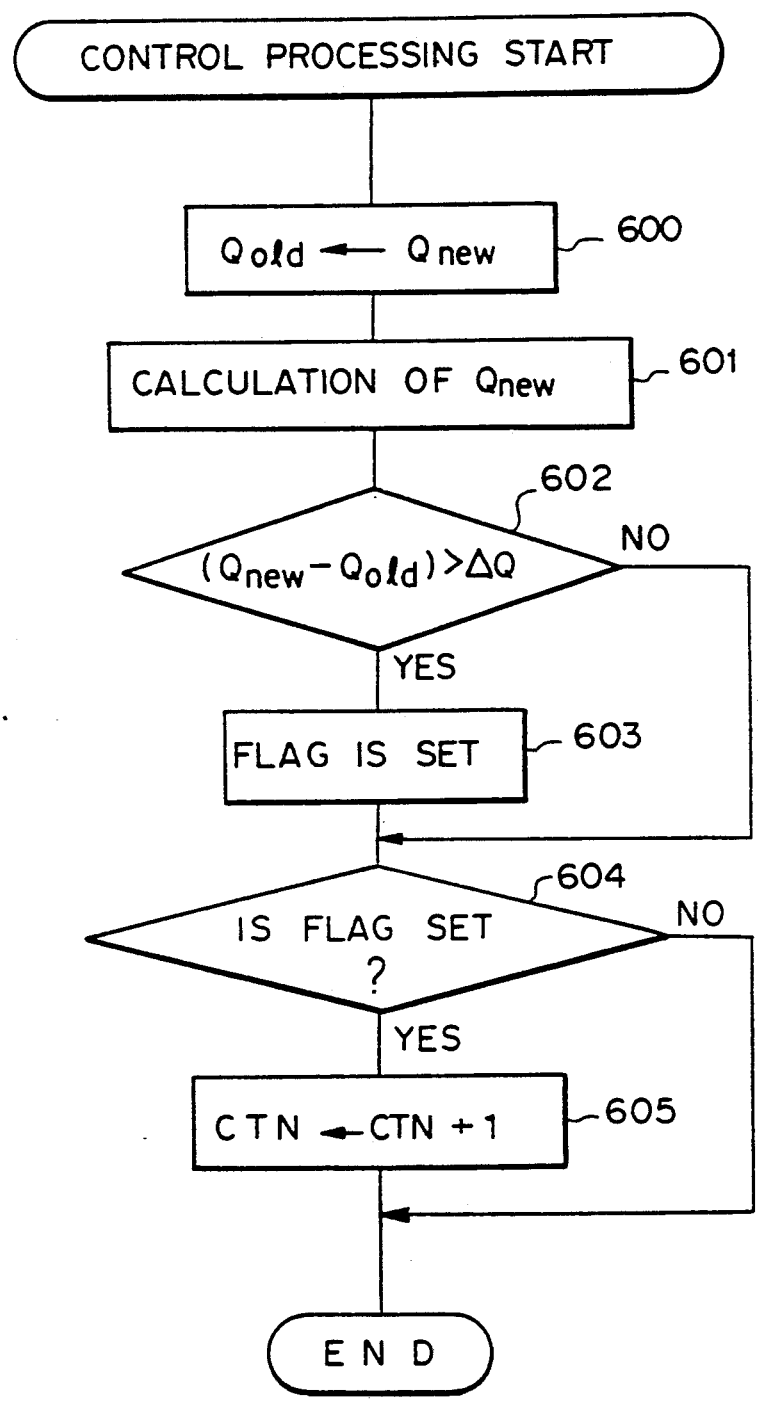
FIG. 17 is a flow chart for starting a process for the injection control.

FIG. 17 shows a processing routine of a start of a control for performing a pre-injection. This routine is performed every 2 msec.

Figure 19:
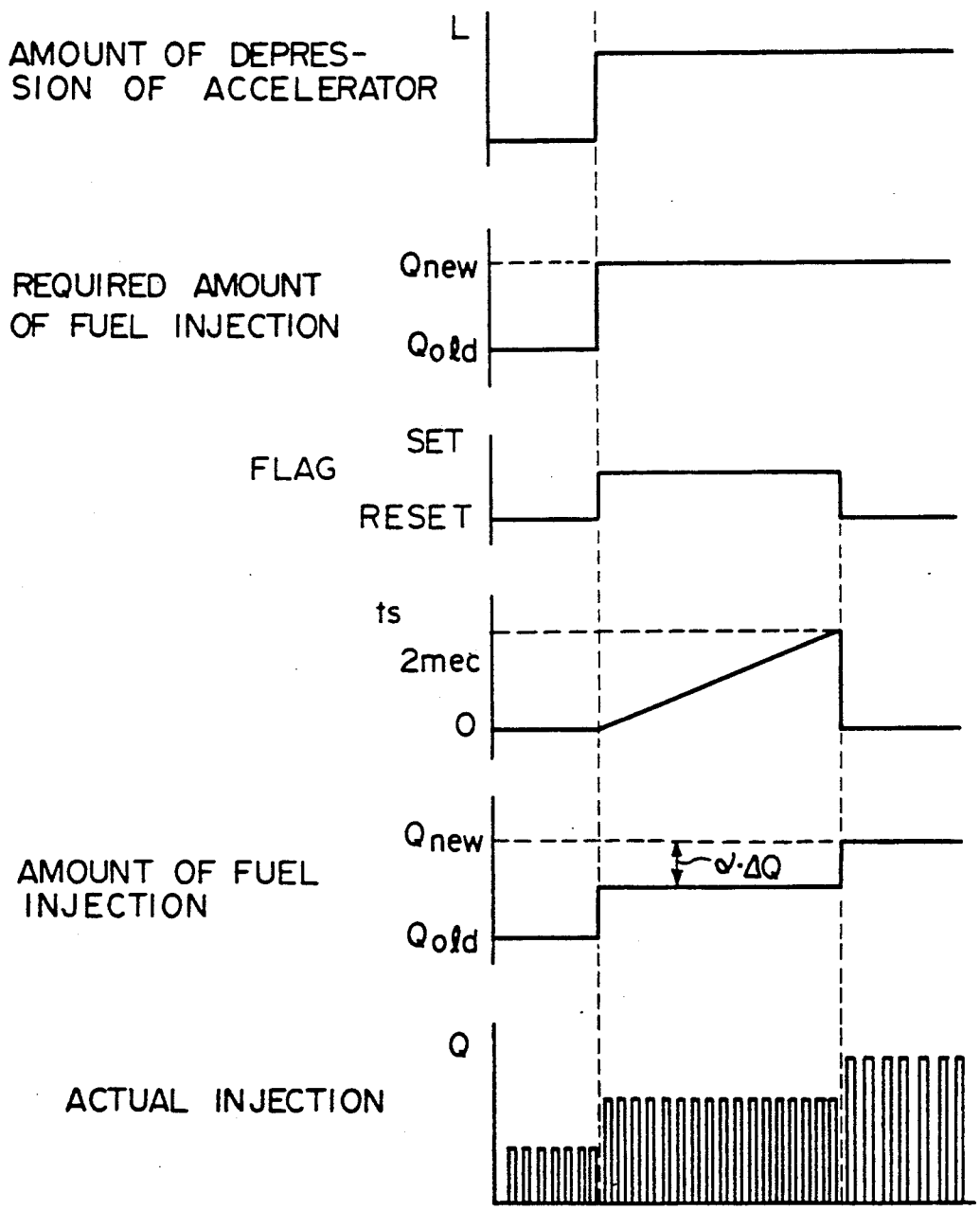
FIG. 19 is a time chart.
Figure 20:
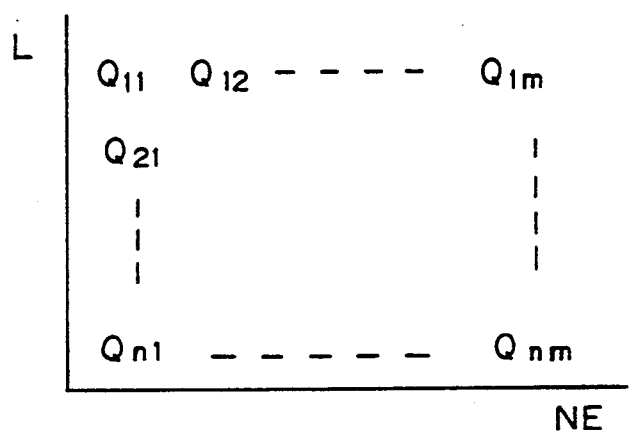
FIG. 20 is a diagram showing a required amount of fuel injection.

This routine is equal to that shown in FIG. 10. With reference to FIG. 17, in step 600, a required fuel injection amount of a preceding time Qnew, which is presently stored, is first made Qold. Then, in step 601, the required fuel injection amount Qnew is calculated from the output signal of a load sensor 18 which represents an amount of depression of the accelerator pedal 20 and an engine speed. The required fuel injection amount Qnew is previously stored in the ROM 12 as the function of the amount L of the depression of the accelerator pedal 20 and the engine speed NE, as shown in FIG. 20. Then, in step 602, whether or not the difference in the required fuel injection amount (Qnew−Qold) within 2 msec is not less than a constant value $\Delta Q$ is discriminated. When (Qnew−Qold)>$\Delta Q$, the procedure proceeds to a step 603, a flag is set, and the procedure proceeds to step 604. In step 604, whether or not the flag is set is discriminated. When the flag is set, the procedure proceeds to step 605 to perform the increment of 1 of the count value CTN. Thus, when a driver quickly depresses the accelerator pedal and the required fuel injection amount changes by $\Delta Q$ or more from Qold to Qnew, as shown in FIG. 19, the flag is set and the count-up operation of the count value CTN is started.

Figure 18:
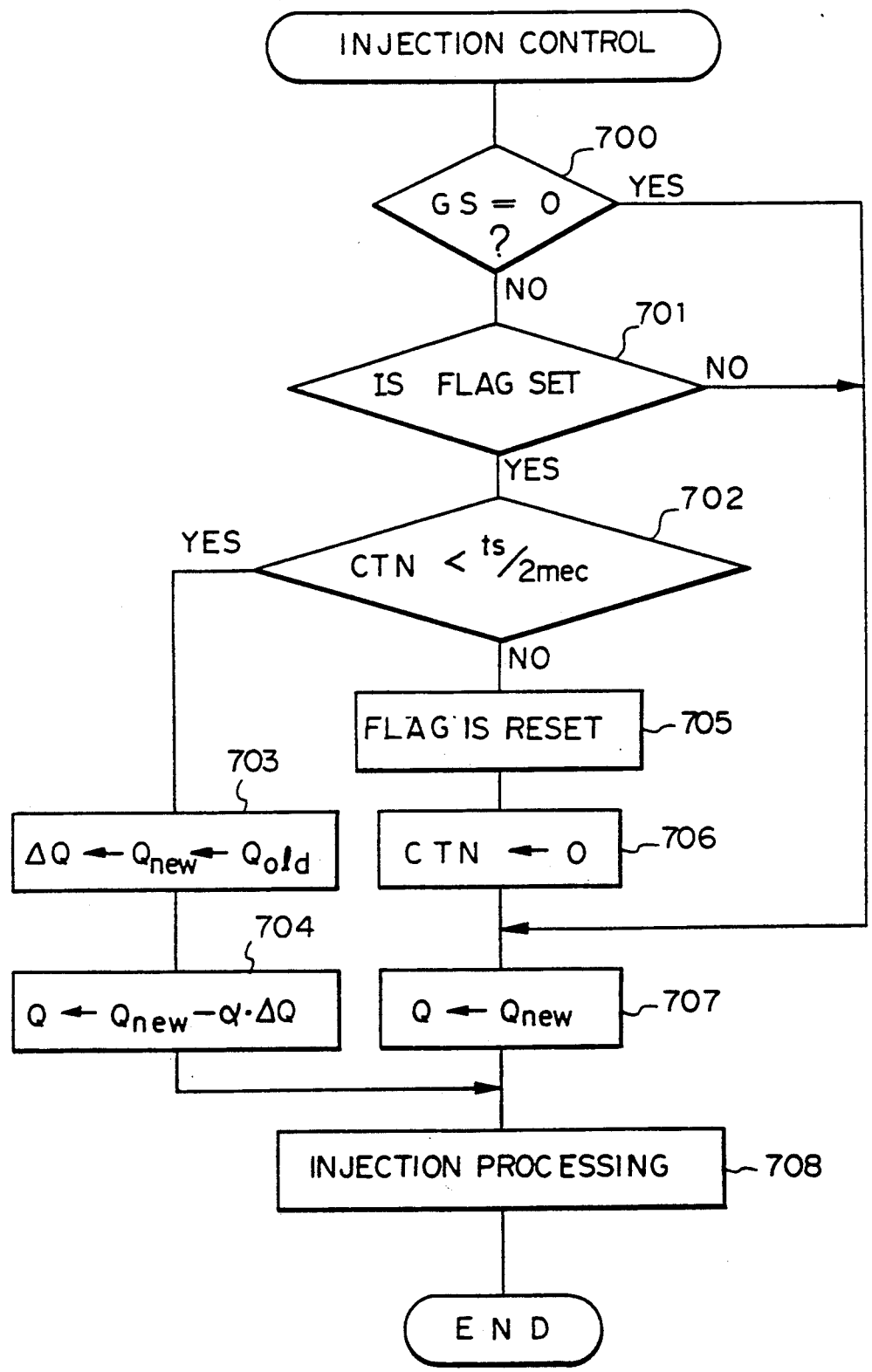
FIG. 18 is a flow chart for the injection control.

FIG. 18 shows a routine for controlling a fuel injection. This routine is performed at every constant crank angle.

With reference to FIG. 18, in a step 700, whether or not GS=0 is first discriminated. When GS=0, the procedure goes to a step 707 make the required fuel injection amount Qnew the fuel injection amount Q. Then, in a step 708, a fuel injecting operation from the fuel injection valve 2 is carried out. On the other hand, when GS is not 0, the procedure proceeds to a step 701 to discriminate whether or not a flag is set. When the flag is reset, the procedure jumps to step 707. On the contrary, when the flag is set, namely, when an engine is driven in an accelerated state, the procedure proceeds to step 702 to discriminate whether or not the count value CTN is smaller than Ts/2, i.e., whether or not a time of ts has elapsed after the acceleration is started. When the time of ts has not elapsed, the procedure proceeds to step 703 to determine a difference between the required fuel injection amount Qnew after the start of acceleration and the required fuel injection amount Qold before the start of acceleration, $\Delta Q$. Then, in a step 704, $\alpha \cdot \Delta Q$ is subtracted from Qnew, whereby the fuel injection amount Q is calculated. Thereafter, the procedure proceeds to step 708. Conse-quently, an actual fuel injection amount Q in each cycle during the time of ts is regarded as (Qnew−$\alpha \cdot \Delta Q$), as shown in FIG. 19.

When the time of ts has elapsed, the routine proceeds from step 702 to step 705, the flag is reset, and the routine proceeds to step 706 to make the count value CTN 0. Then, in step 707, the required fuel injection amount Qnew after the start of acceleration is made the fuel injection amount Q. Thus, as shown in FIG. 19, when the time of ts has elapsed after the start of acceleration, the actual fuel injection amount Q in each cycle is made the required fuel injection amount Qnew.

When GS=0, since the procedure jumps from step 700 to step 707, the fuel of the required fuel injection amount Qnew is continuously injected, if an engine is driven in an accelerated state. The relationship GS=0 is obtained, for example, when the transmission 4 is located at the neutral position, when the clutch is disconnected or when the clutch is half disconnected.

According to the present invention, an engine can be driven in an accelerated state with a good responsiveness and without generating a forward and backward surging of vehicle.

Although the invention has been described by reference to specific embodiments chosen for purposes of illustration, it is apparent that numerous modifications could be made thereto by those skilled in the art without departing from the basic concept and scope of the invention.

I claim:

1. A fuel injection device of an engine for a vehicle having a power transmitting system connected between the engine and a drive wheel, a relative angle of torsion between opposed ends of the power transmitting system being maintained at a converging angle of torsion determined by a required amount of fuel when the engine is driven in a cruising state, said device comprising:

calculating means for calculating a required amount of fuel, which is increased in accordance with an increase in an engine load;

fuel injection means for carrying out a pre-injection and then a main injection when the required amount of fuel is changed from a first required amount of fuel to a second required amount of fuel, the amount said main injection being equal to said second required amount of fuel; and injection control means for controlling an amount of fuel and an injection time of said pre-injection and a start time of injection of said main injection to make the relative angle of torsion substantially equal to the converging angle of torsion determined by said second required amount of fuel when said main injection is started and substantially maintain the relative angle of torsion at the converging angle of torsion determined by said second required amount of fuel after said main injection is started.

2. A fuel injection device according to claim 1, further comprising:
a detecting means for detecting the engine load and a detecting means for detecting an engine speed, wherein said calculating means calculates the required amount of fuel from the engine load and an engine speed.

3. A fuel injection device according to claim 1 further comprising:
a judging means for judging whether or not all outputs of the engine are substantially transmitted to the drive wheel, wherein said fuel injection means does not carry out the pre-injection but conducts only the main injection when all the outputs of the engine are not substantially transmitted to the drive wheel and when the required amount of fuel is changed from the first required amount of fuel to the second required amount of fuel.

4. A fuel injection device according to claim 3, wherein the power transmitting system is provided with a transmission and a detecting means for detecting that the reduction gear ratio of the transmission is provided and said judging means judges that all of the outputs of the engine are not substantially transmitted to the drive wheel when the reduction gear ratio does not coincide with a previously stored reduction gear ratio.

5. A fuel injection device according to claim 4, further comprising:
a detecting means for detecting a vehicle speed and a detecting means for detecting an engine speed, wherein said detecting means for detecting the reduction gear ratio detects the reduction gear ratio from a vehicle speed and the engine speed.

6. A fuel injection device according to claim 3, wherein said power transmitting system is provided with a clutch device, and said judging means judges that all of the outputs of the engine are not substantially transmitted to the drive wheel when said clutch device is not substantially completely connected.

7. A fuel injection device according to claim 3, wherein said power transmitting system is provided with a transmission and said judging means judges that all of the outputs of the engine are not substantially transmitted to the drive wheel when said transmission is located in a neutral range.

8. A fuel injection device according to claim 1, wherein said fuel injection means carries out the pre-injection and then the main injection only when the difference between the first required amount of fuel and the second required amount of fuel exceeds a predetermined constant value.

9. A fuel injection device according to claim 1, wherein said injection control means determines an amount of fuel Foi of the pre-injection, an injection time ts of the pre-injection and a start time of injection $t_1$ of the main injection so as to satisfy the following equations;

$$t_s = \frac{1}{\sqrt{1-\zeta^2}\,\omega_o}\left\{\pi + \tan^{-1}\frac{e^{\zeta\omega_o t_1}\sin\sqrt{1-\zeta^2}\,\omega_o t_1}{e^{\zeta\omega_o t_1}\cos\sqrt{1-\zeta^2}\,\omega_o t_1 - 1}\right\}$$

$$F_{oi} = \frac{e^{\zeta\omega_o t_s}}{\sqrt{e^{2\zeta\omega_o t_1} - 2e^{\zeta\omega_o t_1}\cos\sqrt{1-\zeta^2}\,\omega_o t_1 + 1}}\,F_o$$

$$\omega_o^2 = \frac{m_1 + m_2}{m_1 m_2}k \qquad \zeta = \frac{c}{2}\sqrt{\frac{m_1 + m_2}{m_1 m_2 k}}$$

wherein
$m_1$: equivalent mass of the engine
$m_2$: mass of the vehicle
$k$: spring constant of the power transmitting system
$c$: damping coefficient of the power transmitting system.

10. A fuel injection device according to claim 1, wherein the amount of fuel of the pre-injection is equal to the second required amount of fuel and said injection control means controls the injection time of the pre-injection and the start time of injection of the main injection to make a relative angle of torsion substantially equal to a converging angle of torsion determined by the second required amount of fuel when the main injection is started and substantially maintains the relative angle of torsion at the converging angle of torsion determined by the second required amount of fuel after the main injection is started.

11. A fuel injection device according to claim 10, further comprising:
a storing means for storing the injection time of the pre-injection and the start time of injection of the main injection, wherein the injection control means controls the injection time of the pre-injection and the start time of injection of the main injection based on the injection time of the pre-injection and the start time of injection of the main injection stored in the storing means.

12. A fuel injection device according to claim 11, wherein the power transmitting system is provided with a transmission and the injection time of the pre-injection and the start time of injection of the main injection stored in the storing means are functions of the reduction gear ratio of the transmission.

13. A fuel injection device according to claim 1, wherein said pre-injection is continuously carried out until the main injection is started and said injection control means controls the amount of fuel and the injection time of said pre-injection to make the relative angle of torsion substantially equal to the converging angle of torsion determined by the second required amount of fuel when the main injection is started and substantially maintains the relative angle of torsion at the converging angle of torsion determined by the second required amount of fuel after the main injection is started.

14. A fuel injection device according to claim 13, wherein the amount of fuel Q of the pre-injection is determined by the following equation;

$$Q = Qnew = \alpha(Qnew - Qold)$$

wherein
- Qold: the first required amount of fuel
- Qnew: the second required amount of fuel
- $\alpha$: coefficient 15. A fuel injection device according to claim 14, wherein a storing means for storing the injection time of the pre-injection and said coefficient $\alpha$ is provided and said injection control means controls the injection time and the amount of fuel of the pre-injection based on the injection time of the pre-injection and the coefficient $\alpha$ stored in the storing means.

16. A fuel injection device according to claim 15, wherein the power transmitting system is provided with a transmission and the injection time of the pre-injection and the coefficient $\alpha$ stored in the storing means are functions of the reduction gear ratio of the transmission.

* * * * *

UNITED STATES PATENT AND TRADEMARK OFFICE
CERTIFICATE OF CORRECTION

PATENT NO.  : 5,090,379
DATED       : February 25, 1992
INVENTOR(S) : Ito

It is certified that error appears in the above-identified patent and that said Letters Patent is hereby corrected as shown below:

Column 3, line 30, change "accom-pan-" to -- accompan --

Column 5, line 14, change "--- $Q_2$Actu-" to -- ---$Q_2$. Actu- --
          line 55, change "m2" to -- $m_2$ --

Column 6, line 15, change "$x_1$" to -- $\ddot{x}_1$ --

Column 7, line 49, change "$x_1$" to -- $\ddot{x}_1$ --

Column 6, line 15, change "$x_1$" to -- $\dot{x}_1$ -- line 19, change "$x_1$" to -- $\dot{x}_1$ --

Column 7, line 51, change "$x_1$" to -- $\dot{x}_1$ --

Column 6, line 15, change "$x_2$" to -- $\dot{x}_2$ -- line 17, change "$x_2$" to -- $\dot{x}_2$ -- line 57, change "$x_2$" to -- $\dot{x}_2$ -- line 61, change "$x_2$" to -- $\ddot{x}_2$ --

Column 7, line 51, change "$x_2$" to -- $\dot{x}_2$ --

Column 6, line 17, change "$x_2$" to -- $\ddot{x}_2$ -- line 57, change "$x_2$" to -- $\ddot{x}_2$ --

UNITED STATES PATENT AND TRADEMARK OFFICE
CERTIFICATE OF CORRECTION

PATENT NO. : 5,090,379
DATED : February 25, 1992
INVENTOR(S) : Ito

It is certified that error appears in the above-identified patent and that said Letters Patent is hereby corrected as shown below:

Column 7, line 4, change "$x_2$" to -- $\ddot{x}_2$ -- line 26, change "$x_2$" to -- $\ddot{x}_2$ -- line 49, change "$x_2$" to -- $\ddot{x}_2$ --

Column 8, line 45, change "$x_2$" to -- $\ddot{x}_2$ -- line 58, change "$x_2$" to -- $\ddot{x}_2$ --

Column 9, line 61, change "$x_2$" to -- $\dot{x}_2$ --

Column 11, line 46, change "n" to -- N --

Column 14, line 29, change "Conse-quently" to
-- Consequently --

Column 17, line 1, change "--Qnew=a--" to -- Qnew-a--- --

Signed and Sealed this

Sixteenth Day of November, 1993

Attest:

BRUCE LEHMAN

Attesting Officer     Commissioner of Patents and Trademarks